(12) United States Patent
Yamada et al.

(10) Patent No.: US 7,507,523 B2
(45) Date of Patent: Mar. 24, 2009

(54) OPTICAL INFORMATION RECORDING MEDIUM, METHOD OF MANUFACTURING THE OPTICAL INFORMATION RECORDING MEDIUM, AND METHOD OF AND APPARATUS FOR RECORDING/REPRODUCING OPTICAL INFORMATION

(75) Inventors: Katsuyuki Yamada, Kanagawa (JP);
Shinya Narumi, Kanagawa (JP);
Makoto Harigaya, Kanagawa (JP);
Katsuhiko Tani, Tokyo (JP); Noriyuki Iwata, Kanagawa (JP); Nobuaki Onagi, Kanagawa (JP); Kazunori Ito, Kanagawa (JP); Takashi Shibaguchi, Kanagawa (JP); Eiko Hibino, Kanagawa (JP); Hajime Yuzurihara, Kanagawa (JP); Hiroko Ohkura, Kanagawa (JP); Akira Shimofuku, Kanagawa (JP); Yuki Nakamura, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 465 days.

(21) Appl. No.: 09/966,171

(22) Filed: Sep. 28, 2001

(65) Prior Publication Data
US 2002/0110063 A1    Aug. 15, 2002

(30) Foreign Application Priority Data

| Sep. 28, 2000 | (JP) | ............................. 2000-297364 |
| Oct. 11, 2000 | (JP) | ............................. 2000-310536 |
| Dec. 1, 2000 | (JP) | ............................. 2000-367361 |
| Mar. 26, 2001 | (JP) | ............................. 2001-088516 |

(51) Int. Cl.
*G11B 7/24* (2006.01)

(52) U.S. Cl. ................. 430/270.13; 430/945; 428/64.8; 369/275.2; 369/275.4

(58) Field of Classification Search ............ 430/270.13, 430/945; 428/64.5; 369/275.2, 275.5, 205.2
See application file for complete search history.

(56) References Cited

U.S. PATENT DOCUMENTS

| 3,530,441 | A | | 9/1970 | Ovshinsky ................. 340/173 |
| 4,889,746 | A | * | 12/1989 | Utsumi et al. ............... 427/162 |
| 5,124,232 | A | * | 6/1992 | Nakanishi et al. ....... 430/270.13 |
| 5,150,351 | A | | 9/1992 | Ohno et al. ................. 369/116 |

(Continued)

FOREIGN PATENT DOCUMENTS

EP    717404    *    6/1996

(Continued)

OTHER PUBLICATIONS

K. Furuya et al., "Disk Structure and Composition of Ge—Te—Sb Recording Film . . . " Lecture Draft, 4th Phase Change Recording Study Symposium, 1992 (translation).

(Continued)

*Primary Examiner*—Martin J Angebranndt
(74) *Attorney, Agent, or Firm*—Cooper & Dunham LLP

(57) ABSTRACT

An optical information recording medium is provided. This medium at least stores information that indicates a maximum recording linear velocity Vh. The medium comprises a substrate having a concentric circular guide groove. This guide grove has land portions and groves portions. At least a phase change type recording layer is formed on the substrate. The recording layer has such a composition and thickness that a dislocation linear velocity V satisfies the relation V≧Vh× 0.85.

33 Claims, 17 Drawing Sheets

U.S. PATENT DOCUMENTS

| | | | |
|---|---|---|---|
| 5,156,693 A | | 10/1992 | Ide et al. |
| 5,221,588 A | * | 6/1993 | Morimoto et al. ............. 430/19 |
| 5,627,012 A | * | 5/1997 | Tominaga et al. ...... 430/270.13 |
| 5,736,657 A | | 4/1998 | Ide et al. ....................... 75/230 |
| 5,785,828 A | | 7/1998 | Yamada et al. ......... 204/298.13 |
| 5,948,496 A | | 9/1999 | Kinoshita et al. ........... 428/64.1 |
| 5,974,025 A | | 10/1999 | Yamada et al. .............. 369/288 |
| 6,096,398 A | | 8/2000 | Yuzurihara et al. ......... 428/64.1 |
| 6,103,330 A | * | 8/2000 | Kosuda et al. ............. 428/64.1 |
| 6,115,351 A | * | 9/2000 | Utsunomiya et al. ..... 369/275.2 |
| 6,127,016 A | | 10/2000 | Yamada et al. ............. 428/64.1 |
| 6,177,167 B1 | | 1/2001 | Yuzurihara et al. ......... 428/64.1 |
| 6,221,557 B1 | | 4/2001 | Harigaya et al. ......... 430/270.13 |
| 6,263,152 B1 | * | 7/2001 | Hisatomi et al. ............... 386/70 |
| 6,280,684 B1 | | 8/2001 | Yamada et al. ................ 419/54 |
| 6,319,368 B1 | | 11/2001 | Ide et al. ................ 204/192.26 |
| 6,333,913 B1 | * | 12/2001 | Yoshinari et al. ............ 369/283 |
| 6,391,417 B1 | | 5/2002 | Yuzurihara et al. ......... 428/64.1 |
| 6,426,936 B1 | | 7/2002 | Shinotsuka et al. |
| 6,445,669 B1 | | 9/2002 | Hattori et al. |
| 6,477,135 B1 | * | 11/2002 | Uno et al. ................. 369/275.2 |
| 6,479,121 B1 | | 11/2002 | Miura et al. |
| 6,487,152 B1 | | 11/2002 | Nakamura |
| 6,503,592 B1 | | 1/2003 | Yamada et al. |
| 6,511,788 B1 | * | 1/2003 | Yasuda et al. .......... 430/270.13 |
| 6,548,137 B2 | | 4/2003 | Ito et al. |
| 6,654,543 B2 | * | 11/2003 | Ando et al. .................... 386/95 |
| 2001/0041240 A1 | | 11/2001 | Ito et al. |

FOREIGN PATENT DOCUMENTS

| | | | |
|---|---|---|---|
| EP | 0 735 158 A | | 10/1996 |
| EP | 0 828 245 A | | 3/1998 |
| EP | 919997 | * | 6/1999 |
| EP | 1001415 | * | 5/2000 |
| EP | 1056077 | * | 11/2000 |
| EP | 1 058 249 A | | 12/2000 |
| EP | 1 280 142 A | | 1/2003 |
| JP | 60177446 | | 9/1985 |
| JP | 61219692 | | 9/1986 |
| JP | 61270190 | | 11/1986 |
| JP | 62019490 | | 1/1987 |
| JP | 62073438 | | 4/1987 |
| JP | 63029336 B | | 6/1988 |
| JP | 63228433 | | 9/1988 |
| JP | 63251290 | | 10/1988 |
| JP | 63266632 | | 11/1988 |
| JP | 63266633 | | 11/1988 |
| JP | 1277338 | | 11/1989 |
| JP | 1303643 | | 12/1989 |
| JP | 3231889 | | 10/1991 |
| JP | 4052188 | | 2/1992 |
| JP | 4052189 | | 2/1992 |
| JP | 4078031 | | 3/1992 |
| JP | 4123551 | | 4/1992 |
| JP | 4163839 | | 6/1992 |
| JP | 4191089 | | 7/1992 |
| JP | 4232779 | | 8/1992 |
| JP | 4267192 | | 9/1992 |
| JP | 5345478 | | 12/1993 |
| JP | 6166266 | | 6/1994 |
| JP | 6166268 | | 6/1994 |
| JP | 06-330308 | * | 11/1994 |
| JP | 9138946 | | 5/1997 |
| JP | 9138947 | | 5/1997 |
| JP | 9219021 | | 8/1997 |
| JP | 10-064128 | * | 3/1998 |
| JP | 11115313 | | 4/1999 |
| JP | 2000-067435 | * | 3/2000 |
| JP | 2000-079761 | * | 3/2000 |
| WO | 97/13244 | | 4/1997 |
| WO | 99/38168 | * | 7/1999 |

OTHER PUBLICATIONS

S. Jinno et al., "Erasable Phase Change Optical Disks for Recording at Low . . . " Lecture Draft, 4th Phase Change Recordig Study Symposium, 1992 (translation).

Y. Kawanishi et al., "Write, Read and Erase Characteristics of InSe Phase . . . " Lecture Draft, 4$^{th}$ Phase Change Recording Study Symposium, 1992 (translation).

S.Maito et al., "Erasable Phase Change Optical Disks for Recording at Low . . . " Lecture Draft, 5$^{th}$ Phase Change Recording Study Symposium, 1993 (translation).

J. Tominaga et al., "Overwrite Properties of V Doped In—Ag—Te—Sb Optical . . . " Lecture Draft, 5$^{th}$ Phase Change Recording Study Symposium, 1993 (translation).

Y. Ide et al., "Completely Erasable Phase Change Optical Disk" Lecture Draft, 3$^{rd}$ Phase Change Recording Study Symposium, 1991 (translation).

Patent Abstracts of Japan, abstract of 61-239428 A published Oct. 24, 1986 (abstract of Japan, 63-029336, listed above).

K. Furuya et al., "Disk Structure and Composition of Ge—Te—Sb Recording Film . . . " Lecture Draft, 4th Phase Change Recording Study Symposium, 1992 (with abstract).

S. Jinno et al., "Erasable Phase Change Optical Disks for Recording at Low . . . " Lecture Draft, 4th Phase Change Recording Study Symposium, 1992 (with abstract).

Y. Kawamishi et al., "Write, Read and Erase Characteristics of In Se Phase . . . " Lecture Draft, 4$^{th}$ Phase Change Recording Study Symposium, 1992 (with abstract).

T. Handa et al., "In—Ag—Te—Sb Phase Change Recording Media . . . ," Jpn. J. Appl. Phys. 32:5226-5229 (1993).

S. Maita et al., "Erasable Phase Change Optical Disks for Recording at Low . . . " Lecture Draft, 5$^{th}$ Phase Change Recording Study Symposium, 1993(with abstract).

J. Tominaga et al., "Overwrite Properties of V Doped In—Ag—Te—Sb Optical . . . " Lecture Draft, 5$^{th}$ Phase Change Recording Study Symposium, 1993 (with abstract).

H. Iwasaki et al., "Completely Erasable Phase Change Optical Disk," Jpn. J. Appl. Phys. 31 : 461-465 (1992).

Y. Ide et al., "Completely Erasable Phase Change Optical Disk," Lecture Draft, 3$^{rd}$ Phase Change Recording Study Symposium, 1991 (with abstract).

H. Iwasaki et al., "Completely Erasable Phase Change Optical Disc II : . . . ," Jpn. J. Appl. Phys. 32 : 5241-5247 (1993).

* cited by examiner

※RECORDING LINEAR VELOCITY : A≦B≦C

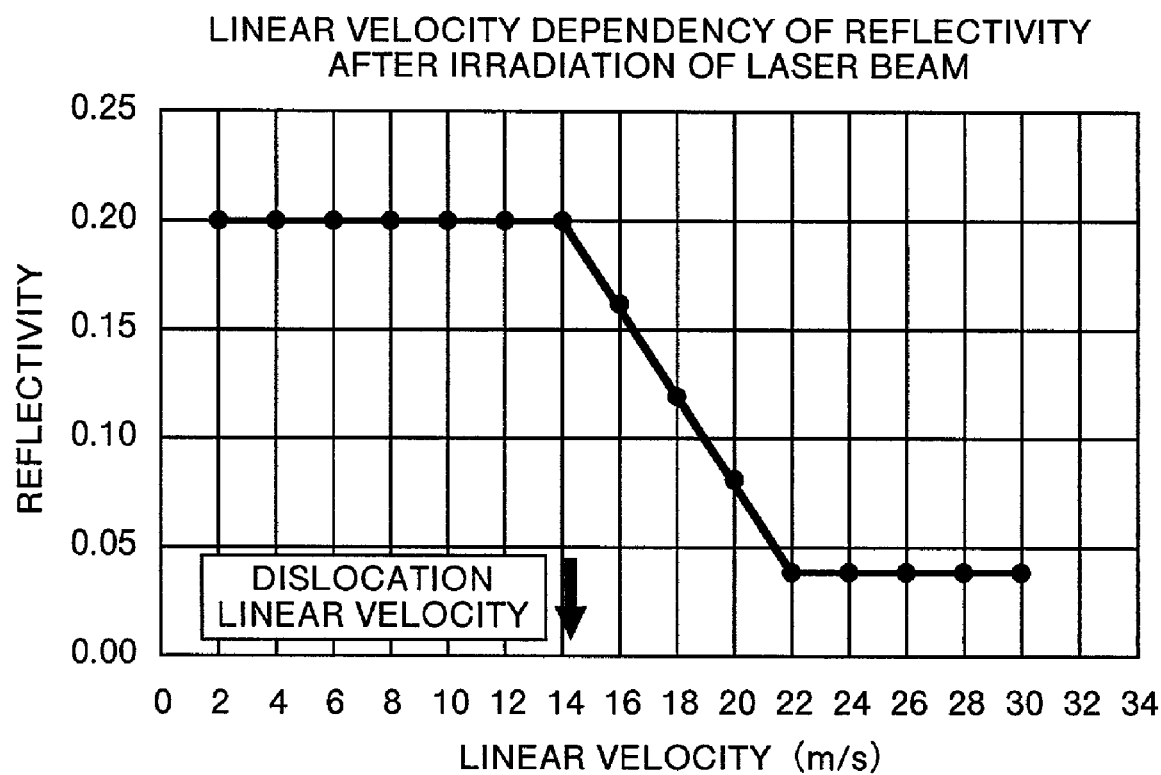

US 7,507,523 B2

OPTICAL INFORMATION RECORDING MEDIUM, METHOD OF MANUFACTURING THE OPTICAL INFORMATION RECORDING MEDIUM, AND METHOD OF AND APPARATUS FOR RECORDING/REPRODUCING OPTICAL INFORMATION

FIELD OF THE INVENTION

The present invention relates to a phase change type optical information recording medium capable of recording/reproducing information and capable of rewriting information, by generating a phase change in a recording layer material through the irradiation of a laser beam onto this recording medium. This invention particularly relates to a phase change type optical information recording medium capable of recording information at high speed. This invention further relates to a method of manufacturing the optical information recording medium according to the present invention, a method of and an apparatus for recording/reproducing optical information onto/from the optical information recording medium according to the present invention.

BACKGROUND OF THE INVENTION

As one of optical information recording media capable of recording information ("recording"), reproducing information ("reproducing"), and erasing information ("erasing") based on an irradiation of a laser beam, what is called a phase change type optical information recording medium has been known well. The phase change type optical information recording medium make use a phenomenon of phase transition between a crystalline and an amorphous phases or between the crystalline and the crystalline phases. Particularly, because of easiness in overwriting information ("overwriting") by using a single laser beam, that is difficult to achieve in case of the optical magnetic recording, and because of a simple optical system of the apparatus used for recording/reproducing, the demand for the phase change type optical information recording medium has been increasing. As a result, CD-RWs, DVD-RWs, and DVD-RAMs have already been commercialized.

In general, if more information is to be recorded at a faster speed, then it becomes necessary to develop recording media having higher density and higher linear velocity.

Likewise, the linear velocity at which information can be recorded ("recording velocity" or "recording liner velocity") with an optical information recording apparatus has also been increasing day-by day. At present, maximum recording linear velocities of different media belonging to the CD family are as follows. In case the CD-R, the maximum recording linear velocity is twelve times faster than that of the CD. In case the CD-RW, the maximum recording linear velocity is ten times faster than that of the CD. Moreover, the recording liner velocity of the CD-RW has always been higher than that of the CD-RW. For example, when the CD-RW had the recording velocity that is four times faster than that of the CD, the CD-R had a recording velocity of eight, ten or twelve times faster than that of the CD.

As a result, although a spindle, a semiconductor laser, and a control system that meet high recording velocity have been installed on the optical information recording apparatus, this optical information recording apparatus has recorded at a low velocity onto a CD-RW. This is mainly for the following reasons. The CD-RW stores information that indicates the standard recording linear velocity or the maximum recording linear velocity of the CD-RW. The optical information recording apparatus recognizes this information and then performs the recording based on a linear velocity that is in line with the read information. Therefore, it was not possible to achieve a higher recording velocity than the maximum recording linear velocity indicated by the information stored in the CD-RW.

Furthermore, the CD-RW disk also stores information indicating the minimum recording linear velocity. Recording on the CD-RW is performed at a recording linear velocity that is determined in such a manner that the recording linear velocity is between the minimum and the maximum recording linear velocities. Consequently, it is difficult in the optical information recording apparatus to perform matching at high-velocity recording. Therefore, such matching has never been realized.

In a phase change type optical information recording medium, usually, it is necessary to optimize a dislocation linear velocity of the medium so that it matches the recording linear velocity.

The dislocation linear velocity is defined as follows. As shown in FIG. 18, the optical information recording medium is rotated at various linear velocities. A semiconductor laser beam is traces a guide groove formed on the optical information recording medium. Because of the irradiation of the laser beam, a material of a recording layer in the optical information recording medium is heated to a melting point or above of that material. Reflectivity, i.e. the light intensity of the light reflected from the optical information recording medium, is measured. An example of the result of such a measurement are shown in FIG. 19. The linear velocity (shown by an arrow mark in FIG. 19) at which the reflectivity starts declining when the linear velocity is increased is called as the dislocation linear velocity.

As disclosed in detail in Japanese Patent Application Laid-open Publication No. 11-115313, it is important to control the dislocation linear velocity of the phase change type optical information recording medium, in order to the maintain the quality. Further, it has been disclosed in this publication, that the optimum dislocation linear velocity at two times to four times the linear velocity of the CD-RW (i.e. 2.4 to 5.6 m/s) is 2.5 to 5.0 m/s.

However, when the groove of the optical information recording medium has been narrowed, when the laser beam wavelength has been decreased, and when NA (number of apertures) have been increased for the purpose of increasing the density, the thermal properties of the optical information recording medium change drastically. Therefore, in order to carry out recording on to a phase change type optical information recording medium in a high-density and high-linear velocity area like two or more times the linear velocity of the DVD and eight or more times the linear velocity of the CD, the following becomes necessary. That is, it becomes necessary to examine the material of the recording layer, the layer structure of the medium, and conditions under which the medium is manufactured once more, and redesign the dislocation linear velocity that satisfies the factors such as the recording linear velocity, track pitch of the guide groove, wavelength of the laser beam, and NA.

Under the above circumstances, conventionally, the recording linear velocity of the CD-RW disk has been designed so as to be between the minimum and the maximum recording linear velocities. Moreover, the dislocation linear velocity is designed so as to be smaller than 0.85 times the maximum recording linear velocity. Thus, conventionally, it was not possible to increase the speed of recording.

As the material ("phase change recording material") for forming the recording layer in the optical information recording medium, there are materials like GeTe, GeTeSe, GeTeS, GeSeS, GeSeSb, GeAsSe, InTe, SeTe, SeAs, Ge—Te—(Sn, Au, Pd), GeTeSeSb, GeTeSb, and AgInSbTe. Particularly, AgInSbTe has high sensitivity and has clear outline at an amorphous portion, and has been developed as a recording layer for a mark edge recording (refer to Japanese Patent Application Laid-open Publication No. 3-231889, Japanese Patent Application Laid-open Publication No. 4-191089, Japanese Patent Application Laid-open Publication No. 4-232779, Japanese Patent Application Laid-open Publication No. 4-267192, Japanese Patent Application Laid-open Publication No. 5-345478, and Japanese Patent Application Laid-open Publication No. 6-166266.)

Japanese Patent Application Laid-open Publication No. 3-231889 discloses a recording layer that is expressed by a general composition expression of a $I \cdot (III_{1-r} V_r) \cdot VI_2$ type, where I represents a I-group element, III represents a III-group element, V represents a V-group element, and VI represents a VI-group element. However, according to this recording layer, a repetitive recording characteristic is not always sufficiently satisfactory.

Further, in the recording layer used in the optical information recording medium disclosed in Japanese Patent Application Laid-open Publication No. 4-191089, an improvement in erasing ratio and a high-speed recording can be achieved. However, there was a problem, in the disclosed technology, that when recording is performed repeatedly the recording characteristic ("repetitive recording characteristic") gets degraded. Further, regarding an information recording medium disclosed in Japanese Patent Application Laid-open Publication No. 1-303643, it has been reported that it is possible to provide a medium having a high C/N ratio and repetitive recording characteristic and excellent preservation characteristic by employing a new crystalline structure. However, there is a drawback that the recording sensitivity and repetitive recording characteristic are not sufficient.

The portion where no information is recorded (i.e. the portion that is crystalline) of the recording layer used in an information recording medium disclosed in Japanese Patent Application Laid-open Publication No. 4-232779 has a structure that a stable phase ($AgSbTe_2$) and an amorphous phase existing around this stable phase coexist. Therefore, although the disclosed medium had improved repetitive recording characteristic, a boundary of fine crystals is generated around the crystalline portion that became a cause of an occurrence of noise.

Existence of the boundary of fine crystals does not produce a seriously bad effect on the recording characteristic of an optical information recording medium that has a relatively low recording density like the CD-RW that uses a laser beam having a recording/reproduction wavelength of about 780 nm. However, the boundary of fine crystals becomes a hindrance in realizing a high-density recording of the DVD that uses a laser beam having a wavelength of 680 nm or below and has a recording density of about four times that of the CD-RW or the DVD-RW that have higher densities. Moreover, the problem of the repetitive recording characteristic remains unsolved.

A crystalline portion of the recording layer used in a recording medium disclosed in Japanese Patent Application Laid-open Publication No. 4-267192 has a structure that a phase of $AgSbTe_2$ isolated from a uniform amorphous phase and other phase (a stable phase or an amorphous phase) coexist. When other phase is an amorphous phase, a problem similar to that of the information recording medium disclosed in Japanese Patent Application Laid-open Publication No. 4-232779 occurs. On the other hand, when the other phase is a stable crystalline phase, there is a problem that it is not possible to obtain satisfactory recording characteristic, as described later.

The technologies disclosed in Japanese Patent Application Laid-open Publication No. 5-345478 and Japanese Patent Application Laid-open Publication No. 6-166268 have problems similar to those described above. Namely, in an optical information recording medium that has a phase change recording material of an AgInSbTe system or this system with an expanded Ib group element, IIIb group element, Vb group element, and the VIb group element as a recording layer, there is no knowledge about a recording medium that prescribes coordination numbers of elements that constitute the recording layer. Therefore, there is no conventional techniques that make clear the roles of functions as a recording material of each constituent element. As a result, there is no detailed improvement carried out, based on a particular theory, in the repetitive recording characteristic of the AgInSbTe recording layer and information recording and erasing sensitivities.

Further, as phase change recording materials for forming the recording layer of the optical information recording medium, there are what are called chalcogen system alloy materials like GeTe, GeTeSn, GeTeS, GeSeS, GeSeSb, GeAsSe, InTe, SeTe, and SeAs, as disclosed in the specification of U.S. Pat. No. 3,530,441.

Further, for the purpose of improving stability and high-speed crystallization, there has been proposed a material having a GeTe system that is added with Au (Japanese Patent Application Laid-open Publication No. 61-219692), SnanAu (Japanese Patent Application Laid-open Publication No. 61-270190), and Pd (Japanese Patent Application Laid-open Publication No. 62-19490) respectively. Further, for the purpose of improving repetitive performance of recording/erasing, there have been proposed materials having specified composition ratios of GeTeSeSb, and GeTeSb (Japanese Patent Application Laid-open Publication No. 62-73438, and Japanese Patent Application Laid-open Publication No. 63-228433).

None of the above-described technologies has been able to satisfy all the characteristics required for a phase change type optical information recording medium. Particularly, there are important problems to be solved, such as the improvement in recording sensitivity and erasing sensitivity, the prevention of a reduction in an erasing ratio due to a remaining of a portion not erased at the time of an overwriting, and the increase in the life of a recorded portion and an unrecorded portion.

In the mean time, in Japanese Patent Application Laid-open Publication No. 63-251290, there has been proposed a recording medium that is equipped with a recording layer consisting of a multi-dimensional compound single layer having a crystalline state in substantially three or more dimensions. In this case, the multi-dimensional compound single layer having a crystalline state in substantially three or more dimensions is defined as a one that has a compound (for example, $In_3SbTe_2$) having a stoichiometric composition of three or more dimensions by 90 atom % or more in a recording layer. It has been disclosed that it is possible to improve the recording and erasing characteristics by using such a recording layer. However, this has a drawback in that the erasing ratio is small, and laser power required for erasing a recording has not yet been lowered sufficiently.

Further, in Japanese Patent Application Laid-open Publication No. 1-277338, there has been proposed an optical information recording medium that has a recording layer consisting of an alloy of a composition as represented by $(Sb_aTe_{1-a})_{1-y}M_y$. Here, $0.4 \leq a \leq 0.7$, and $Y \leq 0.2$, and M is at least one element selected from a group consisting of Ag, Al, As, Au, Bi, Cu, Ga, Ge, In, Pb, Pt, Se, Si, Sn, and Zn. The base of this system is $Sb_2Te_3$. By adding Sb as a surplus, high-speed erasing and repetitive recording characteristic are improved. Moreover, by adding M, the high-speed erasing is further promoted. In addition, it has been disclosed that the erasing ratio due to a DC light is large. However, in this document, there is no description about the erasing ratio at the time of overwriting. Moreover, the recording sensitivity is insufficient. Inventors of the present invention carried out a study on the erasing ratio at the time of overwriting of the disclosed medium, and they found that non-erased portions were disadvantageously remaining.

Japanese Patent Application Laid-open Publication No. 60-177446 discloses a recording layer that uses an alloy of $(In_{1-x}Sb_x)_{1-y}M_y$. Here, $0.55 \leq x \leq 0.80$, and $0 \leq y \leq 0.20$, and M is at least one element selected from a group consisting of Au, Ag, Cu, Pd, Pt, Al, Si, Ge, Ga, Sn, Te, Se, and Bi. Japanese Patent Application Laid-open Publication No. 63-228433 discloses a recording layer that uses an alloy of $GeTeSb_2Te_3Sb$ (where Sb is surplus). However, none of the disclosed media posses satisfactory sensitivity and erasing ratio characteristics.

In addition, Japanese Patent Application Laid-open Publication No. 4-163839 discloses an optical information recording medium in which a recording thin film is formed by including N in a TeGeSb alloy. Japanese Patent Application Laid-open Publication No. 4-52188 discloses an optical information recording medium in which a recording thin film is formed by including at least one of components of a TeGeSe alloy as an a nitride in this alloy. Japanese Patent Application Laid-open Publication No. 4-52189 discloses an optical information recording medium in which a recording thin film is formed by making a TeGeSe alloy adsorb N. However, none of the disclosed optical information recording media posses satisfactory characteristics.

As mentioned above, it is required in case of the conventional optical information recording media to solve important problems such as the improvement in the recording sensitivity and the erasing sensitivity, the prevention of a reduction in an erasing ratio due to a remaining of a non-erased portion at the time of an overwriting, and the increase in the life of a recorded portion and an unrecorded portion.

In the mean time, in recent years, along a rapid popularization of the CD, there has been developed a compact disk into which data can be written only once (i.e. the CD-R). Such CD-Rs have already appeared in the market. However, in case of the CD-R, it is not possible to edit once the data is written. Therefore, when there is an input error in this CD-R, this disk cannot be used, and it has to be abandoned. Consequently, there has been desired a rewritable compact disk that can solve all these problems.

As a result of researches and developments to obtain such a disk, there has been developed a rewritable compact disk that utilizes an optical magnetic disk. However, the optical magnetic disk has drawbacks in that it is difficult to overwrite and that it is difficult to obtain compatibility between the optical magnetic disk and the CD-ROM or the CD-R. Therefore, the phase change type optical information recording medium is being researched because it has an advantage in securing compatibility in principle.

As researches made into a rewritable compact disk that uses the phase change type optical information recording medium, there are examples that have been announced by Furuya and others in the lecture draft at the fourth phase change recording study symposium, 70 (1992), Jinno and others in the lecture draft at the fourth phase change recording study symposium, 76 (1992), Kawanishi and others in the lecture draft at the fourth phase change recording study symposium, 82 (1992), T. Handa and others in Jpn. J. Appl. Phys., 32 (1993), Yoneda and others in the lecture draft at the fifth phase change recording study symposium, 9 (1993), and Tominaga and others in the lecture draft at the fifth phase change recording study symposium, 5 (1993). However, none of them have sufficiently satisfied a total performance including a securing of compatibility with the CD-ROM or the CD-R, recording and erasing performance, recording sensitivity, possible repetitive number of rewriting, number of reproduction, preservation stability, etc. These drawbacks are mainly due to a composition of recording materials and a low erasing ratio attributable to a structure.

Because of the above reasons, it has been expected to develop phase change recording materials that are suitable for high-sensitivity recording and erasing, and to develop a phase change type compact optical information recording medium having high performance and capable of rewriting.

The present inventors have found and proposed that an AgInSbTe system recording material is the material that solves almost all the drawbacks. As representative examples of the publication by the present inventor there are: Japanese Patent Application Laid-open Publication No. 4-78031, Japanese Patent Application Laid-open Publication No. 4-123551, H. Iwasaki and others in Jpn. J. Appl. Phys, 31 (1992) 461, Ide and others in the lecture draft at the third phase change recording study symposium, 102 (1991), and H. Iwasaki and others in Jpn. J. Appl. Phys, 32 (1993) 5241.

The Orange Book part III (version 1.0) was published in October 1996 as a standard of a rewritable compact disk (CD-RW). As the Orange Book part III (version 1.0) is a standard of a CD-RW two-time linear velocity recording (2.4 to 2.8 m/s), a recording time becomes too long based on this low linear velocity. Therefore, an advent of a high-speed recording rewritable compact disk has been expected.

In the mean time, various kinds of recording compensation systems have been disclosed as systems for improving the quality of recording signals in the phase change type recording system.

For example, Japanese Patent Application Laid-open Publication No. 63-266632 discloses, that a system for recording an amorphous mark by using a pulse string is effective in a PWM recording using a recording film having a high crystallization speed.

Further, Japanese Patent Application Laid-open Publication No. 63-266633 and U.S. Pat. No. 5,150,351 disclose, that jitter is improved by restricting a positional fluctuation of a mark edge, by increasing laser energy at the head or tail of a pulse string or by increasing an irradiation time. Further, as described in Japanese Patent Application Laid-open Publication No. 63-29336, there has been known a method of scanning while irradiating an optical spot like a laser beam onto an optical disk in an optical disk recording apparatus, and recording an information signal onto the optical disk by strongly or weakly modulating the optical spot like a laser beam with the information signal. There has also been known a method of reproducing an information signal recorded on an optical disk, and monitoring an amplitude of a reproduction signal and a length of a recording mark, thereby to adjust recording conditions like recording optical power and a width of a recording optical pulse in an optimum state, and set these conditions.

Further, Japanese Patent Application Laid-open Publication No. 9-138946, Japanese Patent Application Laid-open Publication No. 9-138947, and Japanese Patent Application Laid-open Publication No. 9-219021 have disclosed the following. In the case of recording information onto an information recording medium according to a PWM recording system, a recording wave at the time of recording or rewriting a 0 signal having a signal width n×T after modulation (where T is a clock time) is a continuous electromagnetic wave having a power level e. Then, a recording wave pulse string at the time of recording or rewriting a 1 signal having a signal width n×T after modulation is an electromagnetic wave pulse string that has a pulse portion fp having a time width x and a power level 'a', a multi-pulse portion mp in which a low-level pulse of a power level b having a time width T in total and a high-level pulse having a power level c alternately continue by (n−n') times in total at a duty ratio y, and a pulse portion op having a time width z and a power level d, where x, y, and z are in relationships of T×0.5≦x≦T×2.0, 0.4≦y≦0.6, and T×0.5≦z≦T, n' is a positive integer of n'≦n, and a & c≧e≧b & d.

Based on the conventional techniques, there have been substantial improvement in the quality of a recording signal and the stability at the time of repeating an overwriting, and improvement in reliability and general applicability. However, in recent years, a technique for making it possible to record at a plurality of linear velocities (a multi-speed recording) in one information recording medium has been required in a rewritable information recording medium, particularly, in the phase change type optical information recording medium.

Further, a high-speed recording has also been required, and a CAV recording that is advantageous in a high-speed recording has also been required. The technologies in the above-described Japanese Patent Application Laid-open Publication No. 9-138946, Japanese Patent Application Laid-open Publication No. 9-138947, and Japanese Patent Application Laid-open Publication No. 9-219021 have not been able to meet these technical requirements. For example, it has been tried to carry out a recording at an eight-time linear velocity and at a ten-time linear velocity respectively, based on the recording strategy having fp, mp, and op where it is possible to record at four times the linear velocity of the CD. In this case, it has not been possible to obtain sufficient signal quality in the recording at the eight-time linear velocity and at the ten-time linear velocity respectively. Furthermore, there has been a problem of degradation in the signal quality in the overwriting at a different recording linear velocity. For example, there has been a problem of degradation in the signal quality in the case of overwriting at ten times the linear velocity of the CD on a portion recorded at four times the linear velocity of the CD, and overwriting at four times the linear velocity of the CD on a portion recorded at ten times the linear velocity of the CD. Moreover, there has also been a problem of degradation in the signal quality in the overwriting based on a different recording system, such as overwriting in a CAC recording at a CLV recorded portion, and an overwriting in a CLV recording at a CAV recorded portion.

SUMMARY OF THE INVENTION

It is an object of the present invention to provide an optical information recording medium capable of recording at a high speed, and a method of and an apparatus for recording/reproducing optical information capable of recording at a high speed that can sufficiently exhibit the capability of the optical information recording medium.

It is another object of this invention to provide an optical information recording medium that is excellent in a repetitive recording characteristic, recording and erasing sensitivities, and a preservation characteristic, and a method of manufacturing such optical information recording medium.

It has been a conventional subject to obtain an optical information recording medium that can perfectly satisfy the above total performance, and can secure both a recording at a higher speed and preservation and using reliability at high temperatures. In addition, it has been a conventional subject to improve the stability of an overwriting signal quality in a multi-speed CLV recording and a CAV recording, and to make it possible to record based on a general-purpose recording strategy.

In other words, it is still another object of this invention to provide an optical information recording medium that is optimum in recording and erasing at high linear velocity. It is still another object of this invention to provide an optical information recording medium that has satisfactory reliability in high-speed recording and erasing. It is still another object of this to provide an optical information recording medium capable of executing multi-speed CLV recording and CAV recording.

The optical information recording medium according to one aspect of the present invention at least stores information that indicates a standard recording linear velocity Vr and/or a maximum recording linear velocity Vh. Moreover, the optical information recording medium comprises a transparent substrate having a concentric circular guide groove or a spiral guide groove, the guide grove having land portions and groves portions; and at least a phase change type recording layer on the transparent substrate. When reflectivity of the optical information recording medium is measured, while irradiating energy on the guide groove such that the energy melts the material of the phase change type recording layer and while rotating the optical information recording medium and increasing a linear velocity of gradually, and when the linear velocity at which the reflectivity of the optical information recording medium decreases, in comparison to the state when the energy is not radiated, is defined as dislocation linear velocity V, then the dislocation linear velocity V satisfies a relation V≧Vr×0.85 or V≧Vh×0.85.

The method of recording/reproducing optical information according to another aspect of the present invention includes following steps. That is, setting a phase change type of optical information recording medium to an optical information recording/reproducing apparatus, the optical information recording medium recording in advance specific information indicating that a dislocation linear velocity V corresponding to the optical information recording medium satisfies a specific relation; reproducing the specific information from the optical information recording medium; deciding from the specific information, whether it is possible or not to record at a recording linear velocity higher than a maximum recording linear velocity of the optical information recording medium; and recording and reproducing at a recording linear velocity higher than the maximum recording linear velocity, when it is decided in the deciding step that it is possible to record at a higher recording linear velocity than the maximum recording linear velocity.

The apparatus for recording/reproducing optical information according to still another aspect of the present invention comprises following units. That is, a specific information reproduction unit which reproduces a specific information from a phase change type of optical information recording medium, wherein the optical information recording medium recording in advance the specific information indicating that a dislocation linear velocity V corresponding to the optical information recording medium satisfies a specific relation; a deciding unit which decides from the specific information, whether it is possible or not to record at a recording linear velocity higher than a maximum recording linear velocity of the optical information recording medium; and a data reproduction/recording unit which reproduces or records at a linear velocity higher than the maximum recording linear velocity, when the deciding unit decides that it is possible to record at a higher recording linear velocity than the maximum recording linear velocity.

The optical information recording medium according to still another aspect of the present invention comprises a recording layer made from a phase change recording material that changes between an amorphous state and a crystalline state based on irradiation of an electromagnetic beam. The phase change recording material includes at least one element selected from Ag, In, Sb, and Te, and a bond coordination number of the selected element/s is different between an amorphous state after a film formation and a crystalline state after an initialization and after an information erasing.

The method of recording/reproducing optical information according to still another aspect of the present invention is a method of recording/reproducing optical information into/from a phase change type optical information recording medium. The optical information recording medium comprises a recording layer made from a phase change recording material that changes between an amorphous state and a crystalline state based on irradiation of an electromagnetic beam. The phase change recording material includes at least one element selected from Ag, In, Sb, and Te, and a bond coordination number of the selected element/s is different between an amorphous state after a film formation and a crystalline state after an initialization and after an information erasing. The recording layer is formed with an electric power between 250 W and 850 W while raising a temperature of a substrate at a constant rate between 10° C./min and 50° C./min.

The optical information recording medium according to still another aspect of the present invention comprises a disk-shaped substrate; and at least a phase change type recording layer stacked on the substrate. The phase change type recording layer is made from material which includes Ge, Ga, Sb, and Te, and when $\alpha$, $\beta$, $\gamma$, and $\delta$ represent atomic percentages of Ge, Ga, Sb, and Te, and a $\alpha+\beta+\gamma+\delta=100$, then $\alpha$, $\beta$, $\gamma$, and $\delta$ satisfy the relations $0.1 \leq \alpha \leq 7$, $1 \leq \beta \leq 9$, $61 \leq \gamma < 75$, and $22 \leq \delta \leq 30$.

As a result of carrying out investigations into a structure, particularly, a bond coordination number of each element in the phase change recording material consisting of Ag, In, Sb, and Te based on a result of X-ray analyses and electronic line analyses, it has been found that the characteristics of a recording medium change large depending on the coordinate number.

In general, a compound that includes VI-b group elements like Te, Se, and S is called a chalcogenide. As the VI-b group element is bonded in a coordination number of 2, this structure has large flexibility, and is easily vitrified based on freezing in liquid phase. Therefore, this has been widely used as a recording medium. On the other hand, the bond coordination number of In and Sb to Te is 3 simply based on the 8-N rule and the like, and a true bond coordination number has not been clear. Further, it has not been clear whether there is a difference in the bond coordination number of each element between a crystalline state and an amorphous state.

However, in the case of a recording medium, it is considered that a bond coordination number of each element that constitutes a recording medium has a large influence on the recording sensitivity as a disk characteristic, and the erasing sensitivity, the preservation characteristic and the repetition characteristic that are considered to be influenced by a crystallization temperature.

In other words, according to a theory of Phillip's vitrification (J. C. Phillips: J., Non-Cryst, Solids 34 (1979) 153), it is possible to achieve vitrification most easily when an average coordination number of a constituent element is 2.45. This shows that it is possible to achieve vitrification, in other words to perform recording, easily at this coordination number. This coordination number may be taken as a standard to improve the recording sensitivity.

Moreover, a large bond coordination number means that coordination energy is large. This leads to an increase in crystallization temperature, reduction in erasing sensitivity, and an improvement in the preservation characteristic for preventing a loss of a mark. Further, depending on a bond coordination number, there is a possibility that a phase is separated into a mixed phase in stead of a single phase. It is considered that this may becomes a cause of degradation in the repetitive recording characteristic. When it is possible to control a bond coordination number of each element that constitutes a recording material, it is considered that it is possible to substantially improve the characteristic of the recording medium.

As a result of detailed study, the present inventors have found that, in a recording medium that uses Ag, In, Sb, and Te as a material for forming a recording layer, the disk characteristic becomes extremely satisfactory respectively (1) when a bond coordination number of Ag and In to Te in an amorphous state is different from a bond coordination number of Ag and In to Te in a crystalline state, and when the bond coordination number in a crystalline state is larger, (2) when, on the contrary, a bond coordination number of Sb to Te in an amorphous state is smaller, and (3) in these cases, when a structure has a single layer of an NaCl type, and there are a large number of holes in the Cl site occupied by Te.

Particularly, it has been found that there is excellent disk characteristic respectively (a) when a bond coordination number of Ag to Te in the amorphous state after a film formation is between 1.5 and 2.5, an preferably between 1.7 and 2.2, (b) when a bond coordination number of In to Te in the amorphous state after a film formation is between 3.0 and 3.8, and preferably between 3.4 and 3.7, and when a bond coordination number of In to Te in the crystalline state is between 3.4 and 4.2, and preferably between 3.5 and 3.8, and (c) when a bond coordination number of Sb to Te in the amorphous state is between 2.7 and 3.5, and preferably between 2.8 and 3.2, and when a bond coordination number of Sb to Te in the crystalline state is between 2.0 and 2.8, and preferably between 2.4 and 2.6.

Specifically, a composition of the phase change recording material (a recording layer) is set as Ag, In, Sb, and Te, considering a case when a bond coordination number of Ag to Te is 1.8 in the amorphous state after a film formation, and 4.0 after an initial crystallization, when a bond coordination number of In to Te is 3.5 in the amorphous state after a film formation, and 3.7 after an initial crystallization, and when a bond coordination number of Sb to Te is 3.0 in the amorphous state after a film formation, and 2.5 after an initial crystallization.

As the coordination number of Ag is 1.8 in the amorphous state after the film formation, Ag promotes the crystallization as a result of working in a direction to disconnect a random network. In other words, this facilitates the initial crystallization, and forms a polycrystalline state having uniform and fine crystal particles. As a result, the S/N ratio of a mark after a recording improves. Further, an average coordination number Z after an initial crystallization can be obtained easily from the above coordination number and composition. Thus, Z=4×0.05+3.7×0.07+2.5×0.6+2.0×0.28=2.51. This is extremely close to the average coordination number 2.45 at which it is possible to achieve vitrification most easily as suggested by the Phillip reference. This means that it is possible to easily perform recording (vitrification) after an initial crystallization. In other words, the recording sensitivity is satisfactory.

Further, a structure after the initial crystallization is in an NaCl type cubic single phase, and a vitrified state of a recording mark preserves a close distance order. Therefore, as it is possible to preserve this state without a phase separation, the repetitive recording characteristic is also extremely satisfactory. Further, as the coordination number after a recording holds the coordination number after an initial crystallization, Z=2.51 is maintained. Further, the coordination number of Ag at which a network is considered to be disconnected is considered to maintain a value of four after a recording. Therefore, a crystallization of the mark does not proceed easily at a room temperature, and this leads to the improvement in preservation characteristic. Further, a large number of holes at the Cl site that is occupied by Te in the NaCl structure are necessary for holding the NaCl structure in the composition ratio of a recording material. Based on this, the recording layer always holds a single layer without generating a phase separation. As a result, the recording layer has a satisfactory repetitive recording characteristic, and holds a stable phase.

Furthermore, it is preferable that, at the time of forming a recording layer, the recording layer is formed by raising a temperature of a substrate at a rate between 10° C./min and 50° C./min, and preferably between 30° C./min and 40° C./min. It is not clear at present why there arises a difference in the bond coordination number between the amorphous state and the crystalline state according to this method. Further, while it is considered that the film formation rate also gives some influence to this bond coordination number, the reason is not clear yet. As one of potential reasons for this, it can be pointed out that a structure of a recording layer shifts from a close distance order to an intermediate distance order based on the increase in the temperature of a substrate during a film formation. Further, DC sputtering is more preferable to the Rf sputtering.

Other objects and features of this invention will become apparent from the following description with reference to the accompanying drawings.

BRIEF DESCRIPTION OF THE DRAWINGS

FIG. 19 is a diagram showing a result of an evaluation of a dislocation linear velocity.

DESCRIPTION OF THE PREFERRED EMBODIMENTS

Embodiments of the optical information recording medium, method of manufacturing the optical information recording medium, method of and apparatus for recording/reproducing optical information onto/from the optical information recording medium will be explained below with reference to the accompanying drawings.

Figure 1:
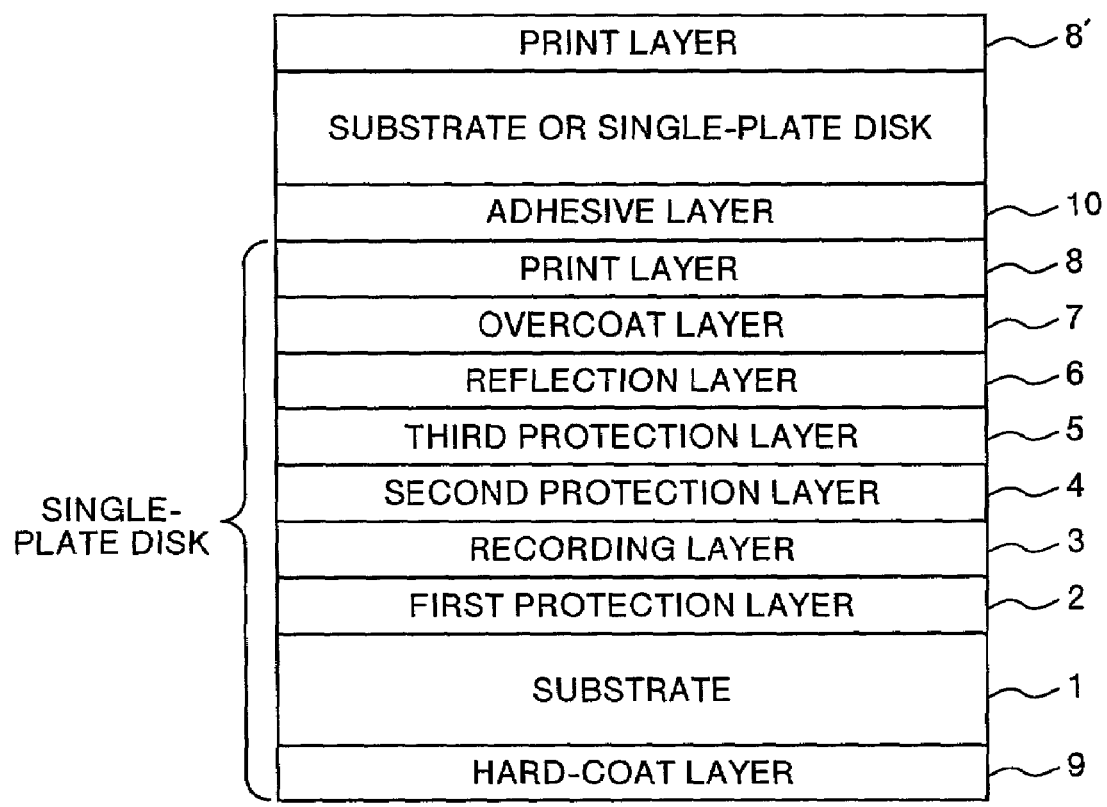
FIG. 1 is a diagram showing an example of a structure of an optical information recording medium according to a first embodiment of the present invention.

FIG. 1 shows an example of a layer structure of the phase change type optical information recording medium according to the first embodiment of the present invention. As a basic structure, on a transparent substrate 1 having a guide groove, there are disposed the first protection layer 2, recording layer 3, second protection layer 4, reflection layer 6, overcoat layer 7, and preferably with the third protection layer 25. Further, there may be disposed the print layer 8 on the over coat layer 7, and there may be disposed the hard-coat layer on the other surface of the substrate 1. A single-plate disk or a transparent substrate may be adhered via the adhesive layer 10 to the print layer 8. If the single-plate disk or the transparent substrate is such that it is not provided with any print layer, then the print layer 8' may be formed on the other surface of this single-plate disk or the transparent substrate.

The substrate 1 may be made from glass, ceramics or resin. However, from the viewpoint of the moldability and the cost, it is preferable to make the substrate 1 from resin.

Examples of resins that may be used to make the substrate 1 are the polycarbonate resin, acrylic resin, epoxy resin, polystyrene resin, acrylonitrile-styrene copolymer resin, polyethylene resin, polypropylene resin, silicone resin, fluororesin, ABS resin, and the urethane resin. From the viewpoint of the moldability, optical characteristic, and the cost, the polycarbonate resin or the acrylic resin are most preferable.

However, in the case of applying an optical information recording medium of the first embodiment to a rewritable disk compatible with a DVD-ROM, it is desirable to meet a condition that a guide groove formed on the substrate 1 has a width between 0.10 and 0.40 μm, and preferably between 0.15 and 0.30 μm, and has a depth between 15 and 65 nm, and preferably between 25 and 50 nm.

While there is no particular limitation on the thickness of the substrate 1, thickness of 0.6 nm is preferable. Moreover, there is no particular limitation on the thickness of the disk after the adhesion, however, the thickness between 1.1 and 1.3 mm is preferable.

Further, in the case of applying an optical information recording medium of the first embodiment to a CD-RW, it is desirable to meet a condition that the guide groove has a width between 0.25 and 0.65 μm, an preferably between 0.30 and 0.55 μm, and has a depth between 25 and 65 nm, and preferably between 30 and 55 nm. While there is no particular limitation on the thickness of the substrate 1, the thickness of 1.2 nm is preferable.

For the recording layer 3, it is preferable to use a phase change type recording material including Sb and Te that generate a phase change between the crystalline phase and the amorphous phase and that can take a stabilized state and a semi-stabilized state respectively, and a composition expression of which is $Sb_\chi Te\ 100-\chi$ ($40 \leq \chi \leq 80$, where $\chi$ is atomic percentage), because of its satisfactory recording (amorphous) sensitivity/speed, erasing (crystallization) sensitivity/speed, and erasing ratio respectively.

When elements such as Ga, Ge, Ag, In, Bi, C, N, O, Si, and S are added to SbTe, it is possible to improve the recording/erasing sensitivities, signal characteristic, and reliability. Thus, it is possible to control the characteristics of the optical information recording medium based on which elements are added ("added element" or "additive element") in what proportion.

The proportion of the added element should be between 0.1 and 20 atomic percentage, and preferably between 1 and 15 atomic percentage. When the proportion of the added element is as mentioned here, initialization can be performed satisfactorily.

Depending on the composition ratio, a dislocation linear velocity of the above material changes, and an optimum recording linear velocity is also different. Therefore, it is necessary to adjust a composition ratio of the material and control the dislocation linear velocity, based on a target recording linear velocity and a target linear velocity area. The study of the present inventors showed that a composition ratio of Te has high correlation with a dislocation linear velocity.

As the quality of the phase change type optical information recording medium used in the first embodiment, reproduction stability of a signal when it has been recorded in the high-density high linear velocity area, and the life (reliability) of the signal are required, as well as the recording/erasing capability.

The above material is excellent for the recording layer 3 that can satisfy almost all the conditions. Particularly, a material expressed by the following composition expression is excellent in the reproduction stability and the life of the signal. Further, this material is preferable, as it is possible to execute the initialization satisfactorily:

$(Ag, Ge)_\alpha (In, Ga, Bi)_\beta Sb_\gamma Te_\delta$, wherein (Ag, Ge) and (In, Ga, Bi) mean respectively that they include at least one kind of elements enclosed by the brackets, $\alpha, \beta, \gamma$, and $\delta$ represent atomic percentages respectively. The atomic percentages $\alpha, \beta, \gamma$, and $\delta$ satisfy the following relationship: $0.1 \leq \alpha < 7$, $1 \leq \beta \leq 15$, $61 \leq \gamma \leq 85$, and $20 \leq \delta \leq 30$.

Further, a material having a cubic lattice crystal structure of an isotropic crystal structure in an un-recorded state after the initialization, preferably, the NaCl type crystal structure, can generate a phase change having small variation with an amorphous phase that is similarly considered to be highly isotropic. This material is preferable as this can perform recording (transformation to amorphous state) and erasing (transformation to crystalline state) uniformly at a high speed.

It is desirable that the recording layer 3 has a thickness between 10 and 50 nm, and preferably between 12 and 30 nm. Further, considering the initial characteristic such as jitter, overwriting characteristic, and the mass-production efficiency, it is preferable that the recording layer 3 has a thickness between 14 and 25 nm. If the recording layer 3 is thicker than 10 nm, the light absorptance is improved, and the characteristic of the recording layer 3 are improved. If the recording layer 3 is thinner than 50 nm, it becomes possible to generate a uniform phase change even at a high speed.

This recording layer 3 can be formed using any of the conventionally known vapor deposition methods. Examples of such methods are the vacuum deposition method, sputtering method, plasma CVD method, optical CVD method, ion-plating method, and the electronic beam deposition method. Among others, the sputtering method is excellent from a viewpoint of mass-production efficiency and film quality.

The first protection layer 2 and the second protection layer 4 may be formed from material such as metal oxides like SiO, $SiO_2$, ZnO, $SnO_2$, $Al_2O_3$, $TiO_2$, $In_2O_3$, MgO, and $ZrO_2$, nitrides like $Si_3N_4$, AlN, TiN, BN, and ZrN, a sulfide like ZnS, $In_2S_3$, and $TaS_4$, carbides like SiC, TaC, $B_4C$, WC, TiC, and ZrC, and diamond carbon. It should be notated that the material listed here may be used singularly or in combination. Moreover, if required, an impurity may be added. However, it is necessary that the melting point of the first protection layer 2 and the second protection layer 4 is higher than that of the recording layer 3.

The first protection layer 2 and the second protection layer 4 can be formed using any of the conventionally known vapor deposition methods. Examples of such methods are the vacuum deposition method, sputtering method, plasma CVD method, optical CVD method, ion-plating method, and electronic beam deposition method. Among others, the sputtering method is excellent from a viewpoint of mass-production efficiency and film quality.

The thickness of the first protection layer 1 produces large influence on the reflectivity, modulation level, and the recording sensitivity. In order to obtain a satisfactory signal characteristic, it is required that the thickness of the first protection layer 2 should be between 60 and 120 m. It is desirable that the second protection layer 4 has a thickness between 5 and 45 nm, and preferably between 7 and 40 nm. If the second protection layer 4 is thicker than 5 nm, then it functions as a perfect heat-resisting protection layer, and thereby the recording density is improved. On the other hand, if the second protection layer 4 is thinner 45 nm, the interface separation does not occur so easily, and the repetitive recording performance is also improved.

The reflection layer 6 is possibly made from metals like Al, Au, Ag, Cu, Ta, Ti, and W, or an alloy that includes these elements. For improving corrosion-proof characteristic, and thermal conductivity, element like Cr, Si, or Pd may be added to the above mentioned metals. It is preferable that the elements listed here are added in a proportion between 0.3 and 2 atomic percentage. If the proportion in which these elements are added is greater than 0.3 atomic percentage, then the corrosion-proof characteristic are improved. On the other hand, if proportion is smaller than 2 atomic percentage, the thermal conductivity is improved, and it becomes easy to form the amorphous state.

The reflection layer 6 can be formed using the any conventionally know vapor deposition method. Examples of such methods are the vacuum deposition method, sputtering method, plasma CVD method, optical CVD method, ion-plating method, and the electronic beam deposition method.

It is desirable that the reflection layer 6 has a thickness between 50 and 200 nm, and preferably between 70 and 160 nm. The reflection layer 6 may have a multi-layer structure. If the reflection layer 6 has the multi-layer structure, each layer of the multi-layer structure needs to have a thickness of at least 10 nm. Moreover, it is desirable that a total thickness of such multi-layer reflection layer 6 to be between 50 and 160 nm.

The overcoat layer 7 is formed on the reflection layer 6 in order to prevent the reflection layer 6 from being oxidized. As the overcoat layer 7, an ultraviolet-ray-cured resin manufactured by spin coating is general. It is desirable that the overcoat layer 7 has a thickness between 3 and 15 µm. If the overcoat layer 7 is thicker than 3 µm, then signal error does not occur even if the print layer 8 is disposed above the overcoat layer 7. On the other hand, if the overcoat layer 7 is thinner than 15 µm, then the internal stress is reduced whereby the mechanical characteristic of the disk are not affected.

As the hard-coat layer 9, an ultraviolet-ray-cured resin manufactured by spin coating is general. It is desirable that the hard-coat layer 9 has a thickness between 2 and 6 µm. If the hard-coat layer 9 is thicker than 2 µm, then sufficient friction damage-proof characteristic can be obtained. If the hard-coat layer 9 is thinner than 6 µm, then the internal stress is reduced whereby the mechanical characteristic of the disk are not affected. The hard-coat layer 9 should be harder to the extent that is not hurt when the layer is rubbed with cloth. For example, the hard-coat layer 9 should be harder than H on the hardness scale for pencils.

It may be effective to mix a conductive material into the material of the hard-coat layer 9. By mixing such material it is possible prevent the hard-coat layer 9 from getting charged and thereby preventing dust from getting adhered to the hard-coat layer 9.

The print layer 8 has been provided to protect the under-playing layer from getting damaged due to friction. Moreover, a label may or the brand name of the manufacturer may be printed on the print layer 8. Moreover, an ink reception layer for an inkjet printer may be formed on the print layer 8. It is general that the print layer is formed from an ultraviolet-ray-cured resin using the screen printing method.

It is desirable that the print layer 8 has a thickness between 3 and 50 µm. If the print layer 8 is thicker than 3 µm, then variation are not generated at the time of formation of the layer. If the print layer 8 is thinner than 50 µm, then the internal stress is reduced whereby the mechanical characteristic of the disk are not affected.

The adhesive layer 10 may be made from the ultraviolet-ray-cured resin, hot-melt adhesive, and the silicone resin. The adhesive layer 10 is formed on the overcoat layer 7 or the print layer 8 using the spin coating method, roll coating method, or the screen printing method, depending upon the material with which the later is to be formed. The disk of the other side may be adhered to the adhesive layer 10 by irradiating the surface with ultraviolet rays, or heating, or pressing.

The disk of the other side may be a single-plate disk or just a transparent substrate. When this disk is to be adhered to the adhesive layer 10, an adhesive may or may not be coated on the surface of the disk that is to be adhered to the adhesive layer 10. Moreover, the adhesive layer 10 may be an adhesive sheet.

There is no particular limitation on the thickness of the adhesive layer 10. However, it is preferable that the adhesive layer 10 has a thickness between 5 and 100 µm, considering the easiness of coating the material, curability, and influence to a mechanical characteristic of the disk.

There is no particular limitation on where the adhesive layer 10 is formed. However, in the case of applying this to a rewritable disk having compatibility with a DVD and/or a CD, in order to achieve a high-speed recording of the first embodiment, it is desirable that the adhesive layer 10 is formed in a region between 15 to 40 mm from the inner periphery, and preferably between 15 to 30 mm from the inner periphery, for securing the adhesive strength.

The third protection layer 5 maybe provided in between each of the transparent substrate 1, first protection layer 2, recording layer 3, second protection layer 4, reflection layer 6, overcoat layer 7, print layer 8, and the adhesive layer 10. The third protection layer 5 is provided in order to improve adhesion between the corresponding layers, preventing chemical reaction between the corresponding, adjusting the optical characteristic, and adjusting the thermal property. It should be noted that, the third protection layer 5 in between the second protection layer 4 and the reflection layer 6 has only been shown in FIG. 1.

Particularly, if the third protection layer 5 is formed in between the second protection layer 4 and the reflection layer 6, it is desirable that the layer is formed using at least one substance selected from a group consisting of C, Si, SiC, SiN, SiO, and $SiO_2$.

It is desirable that the third protection layer 5 has a thickness between 1 and 40 nm, and preferably between 2 and 30 nm. If the third protection layer 5 is thicker than 1 nm, then it easier to form the stable interface layer. On the other hand, if the third protection layer 5 is thinner than 40 nm, then the interface separation does not occur so easily, whereby the inter-layer adhesion is improved.

The third protection layer 5 may be formed using any of the conventionally known vapor deposition methods. Examples of such methods are the vacuum deposition method, sputtering method, plasma CVD method, optical CVD method, ion-plating method, and the electronic beam deposition method. Particularly, considering a mass-production efficiency, the DC-sputtering method is desirable as it is possible to utilize a general-purpose sputtering apparatus.

In order to carry out a mass production of the optical information recording medium in good quality that meets a high linear velocity according to the first embodiment, it is necessary to adjust the dislocation linear velocity as it is required to take a large margin of a recording linear velocity.

The dislocation linear velocity is influenced by the thermal property, and is different depending on a track pitch of the optical information recording medium, wavelength of the laser beam, NA, and laser power. In the case of a phase change type optical information recording medium having a track pitch between 0.2 and 1.4 μm, it has been found that it is important to set the dislocation linear velocity to 6 to 24 m/s when a DC irradiation has been carried out by focusing a semiconductor laser beam to a groove or a land of the guide groove.

When the dislocation linear velocity is higher than 6 m/s, it is possible to achieve the recording in a high linear velocity area like two or more times the linear velocity of the DVD (7.0 m/s) or eight or more times the linear velocity of the CD (9.6 to 11.2 m/s). On the other hand, when the dislocation linear velocity is slower than 24 m/s, the recording sensitivity in an area of a recording linear velocity suitable for recording is not lowered so easily, whereby it becomes possible to execute recording in good quality based on a pulse strategy to be described later.

In general, in the case of overwriting on a phase change type optical information recording medium, there is observed such a phenomenon that jitter increases at the time of overwriting two times, jitter decreases at the time of overwriting three or more times, and jitter is stabilized after overwriting for ten or more times. Since the object of the first embodiment is to achieve high-speed recording, the above mentioned phenomenon becomes sever. Therefore, amount of jitter at the time of recording two times is practically the most important factor in the phase change type optical information recording medium that decided the quality.

Figure 2:
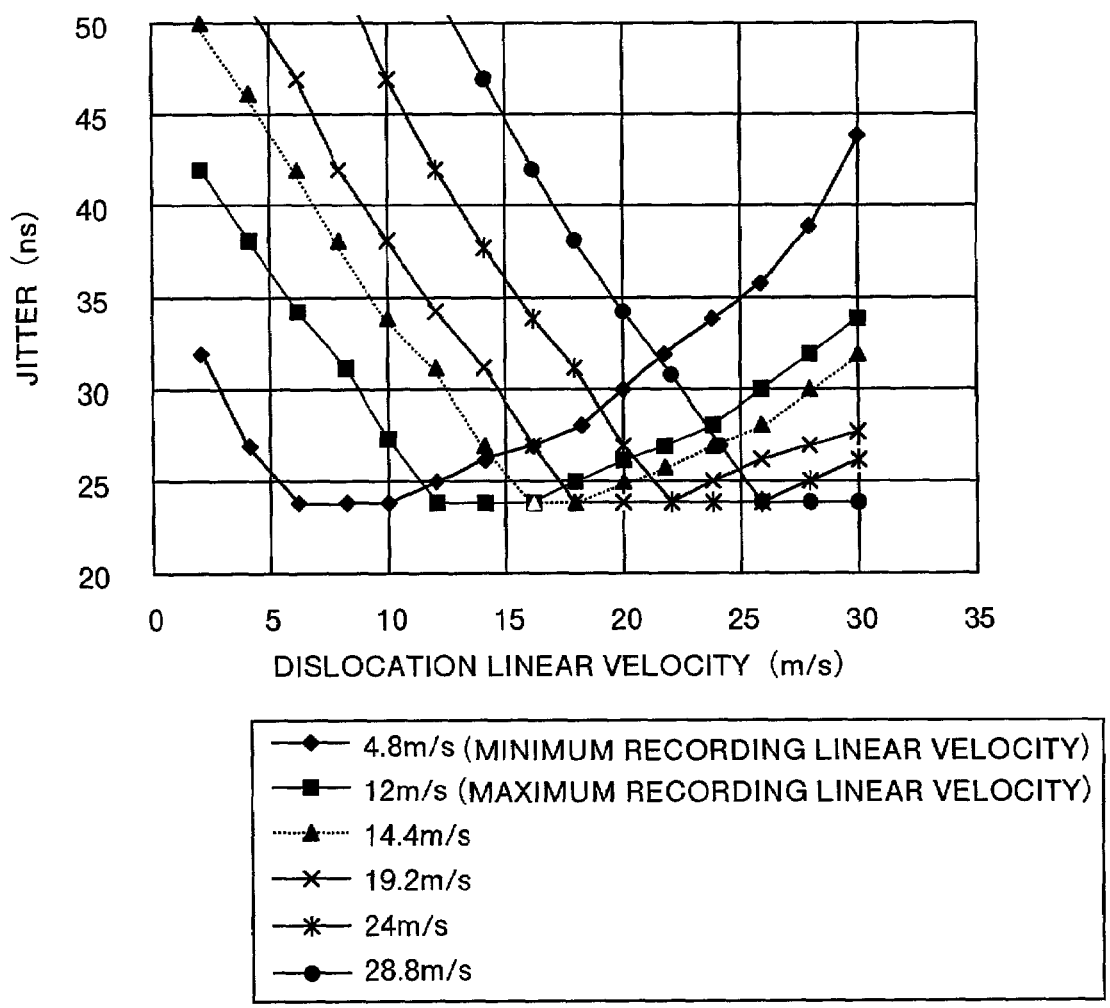
FIG. 2 is a diagram showing a dislocation linear velocity dependency of a two-recording jitter.

FIG. 2 shows jitter when recording is carried out two times using recording power and a recording strategy that the jitter at the time of recording two times becomes smaller than the jitter at the time of recording 1,000 times. Phase change type optical information recording media having different dislocation linear velocities were used for the study. These optical information recording media were manufactured by using a substrate that has information that a minimum recording linear velocity is four times (i.e. 4.8 m/s) the speed of the CD ("CD four-time speed") and a maximum recording linear velocity is ten times (i.e. 12.0 m/s) the speed of the CD ("CD ten-time speed"). The jitter is a value at the time of reproducing at one times the speed of the CD. The value of 35 ns (nanosecond) corresponds to the jitter for the speed of CD and this value satisfies the standard.

It can be understood from FIG. 2, that basically the dislocation linear velocity at which jitter becomes small when the recording linear velocity is four times the speed of a CD and ten times the speed of a CD respectively is 12 m/s.

However, the commercially available CD-RW recording medium that has the minimum recording linear velocity as the CD four-time speed and the maximum recording linear velocity as the CD ten-time speed has the dislocation linear velocity of 9 m/s. This dislocation linear velocity is about 0.75 times the maximum recording linear velocity, and it is matched with the minimum recording linear velocity, i.e. CD four-time speed. In other words, the dislocation linear velocity of the commercially available CD-RW recording medium does not match with the maximum recording linear velocity, i.e. CD ten-time speed.

In order to make it possible to achieve a higher-speed recording which is the object of the first embodiment, particularly in order for a user to sense a high speed, it is necessary to realize a recording linear velocity that is 20% or higher than the maximum recording linear velocity of the CD ten-time speed (that is, 14.4 m/s). In order to suppress the jitter to 35 ns or below as the standard, it can be understood from FIG. 2 that the dislocation linear velocity should be 9.5 m/s or above. In other words, the dislocation linear velocity should be 0.8 times the maximum recording linear velocity or above.

Also it can be understood from FIG. 2, that if recording is to be performed at still higher speed, such as, for example, CD sixteen-time speed (i.e. 19.2 m/s), CD twenty-time speed (i.e. 24 m/s), or CD twenty-four time speed (i.e. 28.8 m/s), the dislocation linear velocity should respectively be 12, 16, or 19 m/s or above.

Moreover, it can be understood from FIG. 2, that in order to have the jitter suppressed to 35 ns or below even at the recording at the minimum recording linear velocity 4.8 m/s, it is necessary that the dislocation linear velocity is below 25 m/s. In other words, a linear velocity that is approximately two times or less than the maximum recording linear velocity becomes an upper limit of the recording linear velocity at which it is possible to execute a recording.

In the above explanation, a CD-RW recording medium has been taken as an example. In the case of other phase change type optical information recording medium, in order to realize a higher-speed recording, it is desirable that the dislocation linear velocity is set to a speed at least 0.8 times the maximum recording linear velocity of the recording medium, preferably, 0.85 times or above, or more preferably, 0.9 times or above.

The CD-RW recording medium having various kinds of dislocation linear velocities shown in FIG. 2 has been manufactured by suitably selecting the composition and thickness of the recording layer 3, selecting impurity to be mixed in the recording layer 3, the material of the reflection layer 6, composition of the dielectric material, and the conditions of the initialization process.

It is possible to adjust the dislocation linear velocity by changing the composition and thickness of each constituent layer, and the processing condition.

For example, the dislocation linear velocity can be decreased by increasing the proportion of Ag and Ge in the material for forming the recording layer 3. On the other hand, the dislocation linear velocity can be increased by decreasing the proportion of In and Ga in the material for forming the recording layer 3. Similarly, the dislocation linear velocity can be decreased by increasing the thickness of the recording layer 3. On the other hand, the dislocation linear velocity can be increased by decreasing the thickness of the recording layer 3.

Moreover, the dislocation linear velocity can be decreased by increasing the thermal conductivity of the second protection layer 4 and the reflection layer 6. On the other hand, the dislocation linear velocity can be increased by decreasing the thermal conductivity of the second protection layer 4 and the reflection layer 6.

Regarding processing conditions, when the recording layer 3, first protection layer 2, second protection layer 4, and the third protection layer 5 are formed using the sputtering method, the dislocation linear velocity decreased by lowering the temperature of the substrate to be input. On the other hand, the dislocation linear velocity can be increased by raising the temperature of the substrate to be input.

Furthermore, the dislocation linear velocity decreased by adding gasses such as $N_2$ and $O_2$ as coexisting gases to Ar at the time of the sputtering. In this case, the dislocation linear velocity becomes fast at an initial stage of the target life, and the dislocation linear velocity becomes slow during a latter half of the target life.

It is also possible to adjust a dislocation linear velocity based on factors such as the linear velocity of the initialization, and the laser power.

Thus, it is possible to determine a value of a dislocation linear velocity based on a combination of various kinds of conditions. Accordingly, the dislocation linear velocity may be adjusted to a desired value by adjusting the conditions in best manner.

It is desirable that the linear velocity for initialization is slower than the dislocation linear velocity. If the initialization linear velocity is faster than the dislocation linear velocity, a rise in the temperature of the recording layer tends to be insufficient whereby it becomes impossible to achieve uniform crystallization. If crystallization is not achieved uniformly, then there occurs variations in the initialization, which generates a disturbance in the RF signal.

Moreover, it is desirable that the initialization linear velocity Vi is 0.5 times or above and 1.6 times or below of the standard recording linear velocity Vr and/or the maximum recording linear velocity Vh. If the initialization linear velocity Vi is above 0.5 times, the good initialization can be performed, moreover, the overwriting performance is good. If the initialization linear velocity Vi less that 1.6 times, the temperature of the recording layer rises insufficient whereby uniform crystallization can be achieved and disturbance in the RF signal is not generated.

Figure 3:
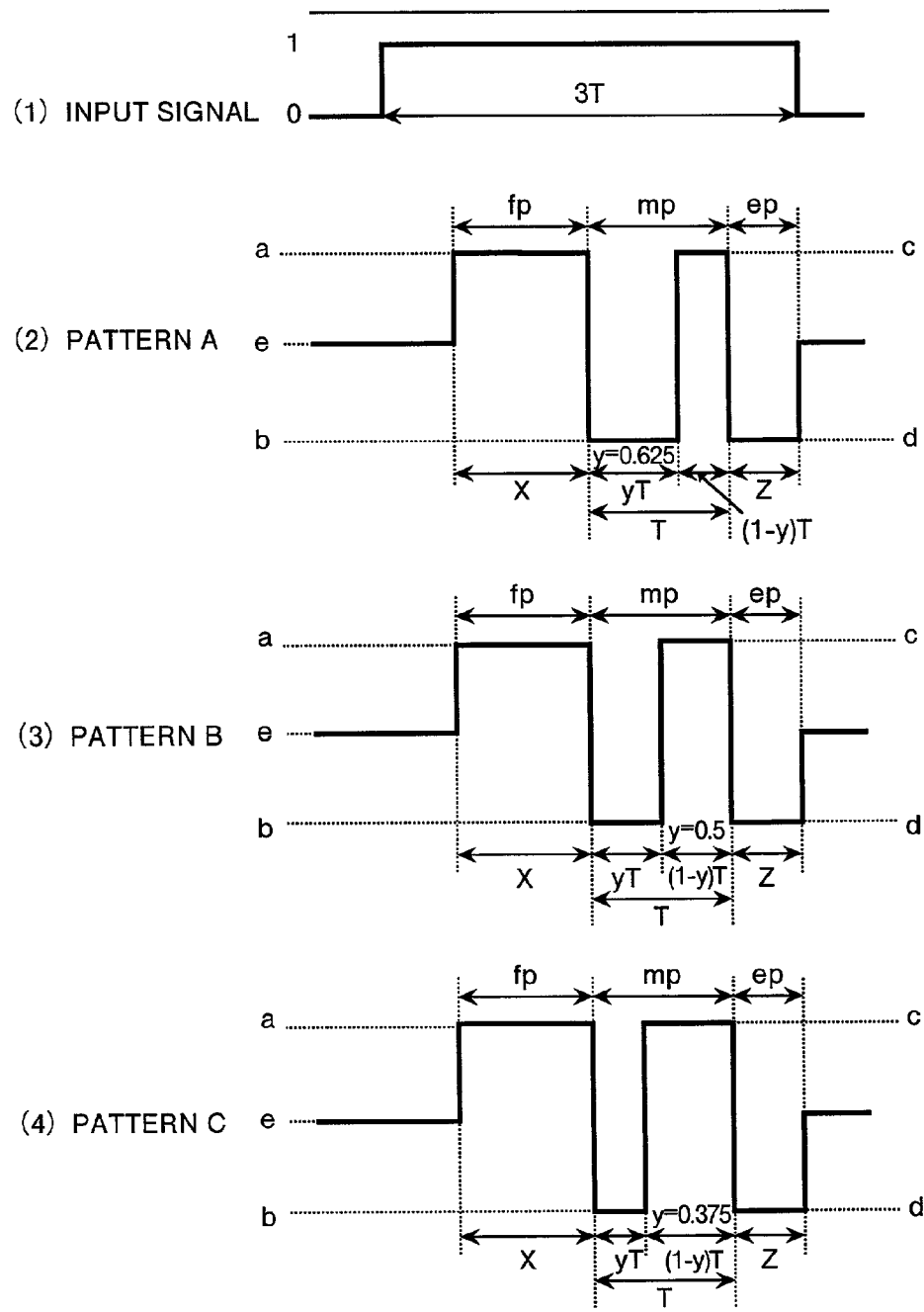
FIG. 3 is a diagram showing examples of a recording pulse waveform according to the first embodiment.
Figure 4:
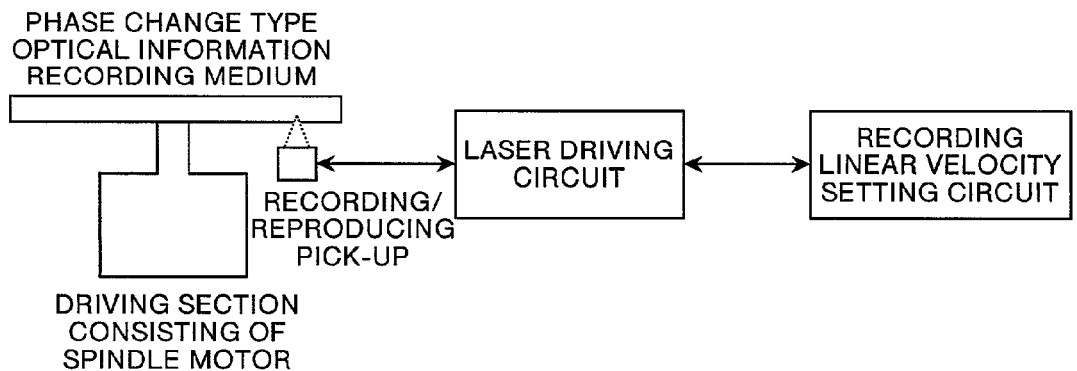
FIG. 4 is a diagram showing an example of recording and reproduction according to the first embodiment of the invention.

FIG. 4 shows one example of the apparatus for recording/reproducing optical information that uses the method according to the first embodiment. As shown in FIG. 4, the driving section includes the spindle motor that drives and rotates the phase change type optical information recording medium according to the present invention. The laser driving circuit drives a power source consisting of a semiconductor laser of the recording/reproducing pick-up. When the recording/reproducing pick-up is drives, it irradiates a laser beam of a pulse strategy having fp, mp, and ep as shown in FIG. 3. With this arrangement, recording is carried out by generating a phase change in the recording layer 3 of the optical information recording medium. The recorded information is reproduced by receiving a reflection beam from the optical information recording medium that has been irradiated with the reproduction beam, with the recording/reproducing pick-up.

Next, a recording of a signal as a width of a mark on the recording layer 3 of the optical information recording medium according to the first embodiment will be explained. In other words, a recording of information based on what is called a PWM recording system will be explained.

When recording information, a signal to be recorded is modulated by using a clock in a modulator based on, for example, the EFM (Eight-to-Fourteen Modulation) system that is suitable for recording the information on a rewritable compact disk, or an improved modulation system of this system.

At the time of carrying out a recording according to the PWM recording system, a recording beam at the time of recording or rewriting a 0 signal having a signal width n×T after modulation (where n represents a positive integer, and T represents a clock time, that is a time corresponding to a period of a clock used for modulating the signal) is a continuous beam having a power level e, and a recording beam pulse string at the time of recording or rewriting a 1 signal having a signal width n×T after modulation is a laser wave pulse string that has a pulse portion fp having a time width x and a power level a, a multi-pulse portion mp in which a low-level pulse of a power level b having a time width T in total and a high-level pulse having a power level c alternately appear and continue by (n−n') times in total at a duty ratio y, and a pulse portion ep having a time width z and a power level d, where x, y, and z are in relationships of $T\times0.125 \leq x \leq T\times2.0$, $0.125 \leq y \leq 0.875$, and $T\times0.125 \leq z \leq T$, a & c $\geq$ e $\geq$ b & d.

FIG. 3 shows an example when n is equal to 3, and n' is equal to 2.

The apparatus for recording/reproducing optical information from the optical information recording medium according to the first embodiment has means for reading information that indicates a maximum recording linear velocity of the disk set in the apparatus, means for reading other specific information from the disk, and deciding whether it is possible to record at a linear velocity higher than the maximum recording linear velocity or not.

One example of the operations performed by the apparatus according to the present invention are as follows:

1. The optical information recording medium according to the present invention is set on a tray of a drive of the apparatus.
2. The drive reproduces ID information or discrimination information from the set optical information recording medium according.
3. The drive collates the same ID information or discrimination information from the optical information recording medium stored in advance in the drive with the ID information or the discrimination information reproduced in 2 above.
4. The drive recognizes the property and characteristic of the set optical information recording medium based on the collation of the ID information or the discrimination information.
5. The drive selects a recording method that is optimal to the set optical information recording medium from a list of recording methods stored in advance, and starts the recording onto the set optical information recording medium.

Examples of the first embodiments will be explained in detail below. However, the invention of the first embodiment is not limited to these examples.

EXAMPLE 1

A polycarbonate substrate 1 having a guide groove with a width of 0.55 μm and depth of 30 nm was prepared by injection molding. On this substrate 1, the first protection layer 2, recording layer 3, second protection layer 4, and the reflection layer 6 were laminated in this order using the sputtering method. The substrate 1 was put into the sputtering unit by keeping the substrate at 55° C. Information that the maximum recording linear velocity is ten times (i.e. 12 m/s) the speed of the CD was recorded onto the substrate 1.

The first protection layer 2 and the second protection layer 4 were made from $ZnS.SiO_2$. The first protection layer 2 had a thickness of 90 nm and the second protection layer had a thickness of 30 nm. The recording layer 3 was made from $Ge_2In_8Sb_{68}Te_{22}$. The recording layer 3 was made 16 nm thick. The reflection layer 6 was made from AlTi (with Ti content of 0.5 weight percent). The reflection layer 6 had a thickness of 140 nm.

As a result, a laminate having a layer structure as follows was formed. That is, the substrate 1 (composition: polycarbonate), first protection layer 2 (composition: $ZnS.SiO_2$, thickness: 90 nm), recording layer 3 (composition: $Ge_2In_8Sb_{68}Te_{22}$, thickness: 16 nm), second protection layer 4 (composition: $ZnS.SiO_2$, thickness: 30 nm), and the reflection layer 6 (composition: AlTi, thickness: 140 nm). Finally, the overcoat layer 7 was formed by spin coating an ultraviolet-ray-cured type resin on the reflection layer 6 to obtain a single-plate disk of the optical information recording medium.

Next, the entire surface of this optical information recording medium was crystallized at a constant linear velocity of 7.0 m/s, from the inner periphery toward the outer periphery, at electric power 850 mW, and feed 120 μm, with an initializing unit having a large diameter LD (a beam diameter 200×1 μm).

The dislocation linear velocity of the optical information recording medium obtained in this way was measured by DC irradiation, by focusing a semiconductor laser beam of a wavelength 780 nm onto a groove portion of the guide groove. The dislocation linear velocity was found to be 12.8 m/s, that is 1.1 times the maximum recording linear velocity.

Next, the optical information recording medium was set into an apparatus for recording optical information that has a list that it is possible to record at a sixteen-time faster a code string of a combination of code information including a read-in time and a read-out time of this optical information recording medium, an optimum recording power code, and a disk type.

This optical information recording apparatus was made to read first the read-in time, the read-out time, the optimum recording power code, and the disk type. Then, the optical information recording apparatus decided whether it is possible or not to achieve a recording at a recording linear velocity equal to or faster than the maximum recording linear velocity based on the combination of this read information. The optical information recording apparatus decided that it is possible to record onto this optical information recording medium at a recording linear velocity of CD sixteen-time speed that is faster than the maximum recording linear velocity.

Next, information was recorded onto this the optical information recording medium in a format capable of being reproduced with a CD-ROM at the recording linear velocity of CD sixteen-time speed. It was found that the jitter characteristic at the initial stage of a recording and even after 1,000 times of overwriting was satisfactory.

Further, a preservation test on the optical information recording medium was carried out by leaving the disk for 500 hours in an environment at a temperature 80° C. and humidity 85%. The optical information recording medium did not show any signs of oxidization of the recording layer 3 or a change in the signal characteristics. Thus, the optical information recording medium can be preserved with great satisfaction for a long time.

As explained above, it possible to realize a high-speed recording at the CD sixteen-time speed on the optical information recording medium that had the maximum recording linear velocity of only ten times that of the CD.

EXAMPLE 2

A polycarbonate substrate 1 having a guide groove with a width of 0.2 μm and depth of 27 nm was prepared by injection molding. On this substrate 1, the first protection layer 2, recording layer 3, second protection layer 4, third protection layer 5, and the reflection layer 6 were laminated in this order using the sputtering method. The substrate 1 was put into the sputtering unit by keeping the substrate at 55° C. Information that the maximum recording linear velocity is 8.44 m/s the speed of the CD was recorded onto the substrate 1.

The first protection layer 2 and the second protection layer 4 were made from $ZnS.SiO_2$. The first protection layer 2 had a thickness of 75 nm and the second protection layer had a thickness of 10 nm. The third protection layer 5 was made from SiC. The third protection layer 5 had a thickness of 3 nm. The recording layer 3 was made from $Ag_{0.5}Ge_{1.5}Ga_8Sb_{68}Te_{22}$. The recording layer 3 had a thickness of 14 nm. The reflection layer 6 was made from AlTi (with Ti content of 0.5 weight percent). The reflection layer 6 had a thickness of 140 nm.

As a result, a laminate having a layer structure as follows was formed. That is, the substrate 1 (composition: polycarbonate), first protection layer 2 (composition: $ZnS.SiO_2$, thickness: 75 nm), recording layer 3 (composition: $Ag_{0.5}Ge_{1.5}Ga_8Sb_{68}Te_{22}$, thickness: 14 nm), second protection layer 4 (composition: $ZnS.SiO_2$, thickness: 10 nm), third protection layer 5 (composition: SiC, thickness: 3 nm), and the reflection layer 6 (composition: AlTi, thickness: 140 nm) Finally, the overcoat layer 7 was formed by spin coating an ultraviolet-ray-cured type resin on the reflection layer 6 to obtain a single-plate disk of the optical information recording medium.

Next, the entire surface of this optical information recording medium was crystallized at a constant linear velocity of 10.0 m/s, from the inner periphery toward the outer periphery, at electric power 850 mW, and feed 120 μm, with an initializing unit having a large diameter LD (a beam diameter 200×1 μm).

The dislocation linear velocity of the optical information recording medium obtained in this way was measured by DC irradiation, by focusing a semiconductor laser beam of a wavelength 660 nm onto a groove portion of the guide groove. The dislocation linear velocity was found to be 14.4 m/s, that is 1.7 times the maximum recording linear velocity.

Next, the optical information recording medium was set into an apparatus for recording optical information that has a list that it is possible to record at a DVD four-time fast speed a code string of a combination of code information including a read-in time and a read-out time of this optical information recording medium, an optimum recording power code, and a disk type.

This optical information recording apparatus was made to read first the read-in time, the read-out time, the optimum recording power code, and the disk type. Then, the optical information recording apparatus decided whether it is possible or not to achieve a recording at a recording linear velocity equal to or faster than the maximum recording linear velocity based on the combination of this read information. The optical information recording apparatus decided that it is possible to record onto this optical information recording medium at a recording linear velocity of DVD four-time speed that is faster than the maximum recording linear velocity.

Next, information was recorded onto this the optical information recording medium in a format capable of being reproduced with a DVD-ROM at the recording linear velocity of DVD four-time speed. It was found that the jitter characteristic at the initial stage of a recording and even after 1,000 times of overwriting was satisfactory.

Further, a preservation test on the optical information recording medium was carried out by leaving the disk for 500 hours in an environment at a temperature 80° C. and humidity 85%. The optical information recording medium did not show any signs of oxidization of the recording layer 3 or a change in the signal characteristics. Thus, the optical information recording medium can be preserved with great satisfaction for a long time.

As explained above, it possible to realize a high-speed recording at a DVD four-time speed on the optical information recording medium that had the maximum recording linear velocity of only 8.44 m/s.

EXAMPLES 3 TO 14

A polycarbonate substrate 1 was prepared by injection molding. On this substrate 1, the first protection layer 2, recording layer 3, second protection layer 4, third protection layer 5, and the reflection layer 6 were laminated in this order using the sputtering method.

The first protection layer 2 and the second protection layer 4 were made from $ZnS.SiO_2$. The first protection layer 2 had a thickness of 80 nm and the second protection layer had a thickness of 10 nm. The third protection layer 5 was made from SiC. The third protection layer 5 had a thickness of 5 nm. The recording layer 3 was made from material having a composition shown in Table 1 to obtain Examples 3 to 14. The recording layer 3 had a thickness of 15 nm. The reflection layer 6 was made from Ag. The reflection layer 6 had a thickness of 140 nm.

As a result, a laminate having a layer structure as follows was formed. That is, the substrate 1 (composition: polycarbonate), first protection layer 2 (composition: $ZnS.SiO_2$, thickness: 80 nm), recording layer 3 (composition: as shown in Table 1, thickness: 15 nm), second protection layer 4 (composition: $ZnS.SiO_2$, thickness: 10 nm), third protection layer 5 (composition: SiC, thickness: 5 nm), and the reflection layer 6 (composition: Ag, thickness: 140 nm). Finally, the overcoat layer 7 was formed by spin coating an ultraviolet-ray-cured type resin on the reflection layer 6 to obtain a single-plate disk of the optical information recording medium.

Next, the recording layer 3 of the optical information recording medium was crystallized with an initializing unit having a large diameter LD (a beam diameter 200×1 μm).

Thereafter, a single-plate disk having a polycarbonate substrate thickness of 0.6 mm was adhered onto the overcoat layer 7 via an adhesive (i.e. the adhesive layer 10). Then, the print layer 8' was formed on the other surface of this polycarbonate substrate. Thus, a adhesion-type disk was obtained.

Table 1 shows the parameters of the optical information recording/reproducing media according to Example 3 to 14. These parameters include: the polycarbonate substrate thickness, disk structure of either the single plate or the adhesion-type disk, track pitch, various conditions for manufacturing a composition of the recording layer 3, wavelength of a pick-up of an apparatus used for recording and reproducing on/from thus obtained the optical information recording/reproducing media, dislocation linear velocity, recording linear velocity, and the result of evaluation.

TABLE 1

| | PREPARATION CONDITIONS | | | | | | | | | EVALUATION WAVELENGTH | RE-CRYSTALLIZATION UPPER LINEAR VELOCITY | RECORDING LINEAR VELOCITY | EVALUATION RESULT | | |
|---|---|---|---|---|---|---|---|---|---|---|---|---|---|---|---|
| EXAMPLE | SUBSTRATE THICKNESS (mm) | PLATE STRUCTURE | TRACK PITCH (μm) | RECORDING LAYER COMPOSITION | | | | | | | | | JITTER CHARACTERISTIC (σ/T) (%) | | PRESERVATION |
| | | | | Ag | Ge | In | Ga | Sb | Te | (nm) | (m/s) | (m/s) | INITIAL | DOW1000 | TEST |
| 3 | 1.2 | SINGLE-PLATE | 1.4 | 3 | 1 | 6 | 0 | 62 | 28 | 780 | 9.8 | 9.6 | 7.8 | 9.2 | OK |
| 4 | 1.2 | SINGLE-PLATE | 1.4 | 0 | 4 | 0 | 6 | 64 | 26 | 780 | 10.5 | 9.6 | 7.1 | 8.3 | OK |
| 5 | 1.2 | SINGLE-PLATE | 1.4 | 6 | 0 | 4 | 0 | 68 | 22 | 780 | 13.5 | 14.4 | 7.8 | 9.0 | OK |
| 6 | 1.2 | SINGLE-PLATE | 1.4 | 1 | 1 | 1 | 4 | 69 | 24 | 780 | 15.0 | 14.4 | 7.4 | 8.8 | OK |
| 7 | 1.2 | SINGLE-PLATE | 1.4 | 0 | 0.1 | 0 | 3.9 | 74 | 22 | 780 | 18.5 | 19.2 | 8.0 | 9.2 | OK |
| 8 | 0.6 | ADHESION | 0.74 | 1 | 0 | 0 | 5 | 64 | 30 | 660 | 6.2 | 7.0 | 7.6 | 9.3 | OK |
| 9 | 0.6 | ADHESION | 0.74 | 3 | 2 | 3 | 0 | 70 | 22 | 660 | 9.5 | 7.0 | 7.0 | 8.2 | OK |
| 10 | 0.6 | ADHESION | 0.74 | 1 | 2 | 5 | 0 | 68 | 24 | 660 | 10.0 | 7.0 | 7.3 | 8.3 | OK |
| 11 | 0.6 | ADHESION | 0.74 | 2 | 0 | 7 | 2 | 67 | 22 | 660 | 15.5 | 14.0 | 6.9 | 8.2 | OK |
| 12 | 0.6 | ADHESION | 0.74 | 0 | 1 | 0 | 8 | 69 | 22 | 660 | 23.5 | 24.0 | 8.2 | 9.5 | OK |
| 13 | 0.6 | ADHESION | 0.2 | 1 | 0 | 5 | 2 | 66 | 26 | 400 | 9.0 | 7.0 | 7.8 | 9.2 | OK |
| 14 | 0.6 | ADHESION | 0.2 | 0 | 2 | 0 | 6 | 70 | 22 | 400 | 13.5 | 14.0 | 8.4 | 9.8 | OK |

Jitter characteristic in the result of evaluation has been defined as σ/T (%) standardized in the clock time T.

As can be seen from the evaluation result shown in Table 1, in all the Examples 3 to 14, jitter characteristics at the initial stage and even after overwriting 1,000 times are satisfactory.

Further, a preservation test on the optical information recording medium was carried out by leaving the disk for 500 hours in an environment at a temperature 80° C. and humidity 85%. The optical information recording medium did not show any signs of oxidization of the recording layer 3 or a change in the signal characteristics. Thus, the optical information recording medium can be preserved with great satisfaction for a long time.

An optical information recording medium according to a second embodiment will now be explained. The optical information recording medium according to the second embodiment uses Ag, In, Sb, and Te as main constituent elements. Further, at least one kind of a specific element selected from the III-b group, the IV-b group, and the V-b group in the period law table has been added to these elements. With this arrangement, the phase change type recording material has sufficient characteristics of the medium in a high-linear velocity and high-density recording, and has particularly excellent characteristics in repetitive recording, and preservation reliability at an initial recording period and after a repetitive recording.

Figure 6:
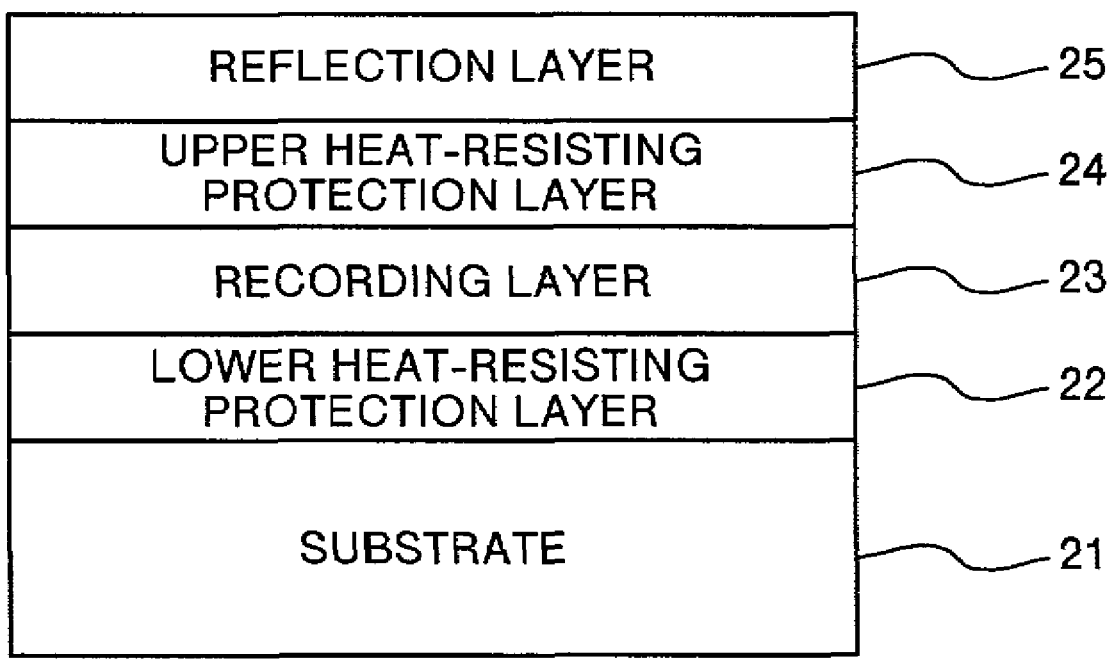
FIG. 6 is a cross-sectional diagram showing a structure of an optical information recording medium according to a third embodiment of the invention.

As shown in FIG. 6, this optical information recording medium comprises the substrate 21 on which the lower heat-resisting protection layer ("lower protection layer") 22, recording layer 23, upper heat-resisting protection layer ("upper protection layer") 24, and the reflection layer 25 are laminated in this order. The recording layer 23 is mainly made from elements such as Ag, In, Sb, and Te. Further, at least one kind of a specific element selected from the III-b group, the IV-b group, and the V-b group in the period law table has been added to these elements as described above. The recording layer of thus obtained optical information recording medium was initialized, that is changed from an amorphous state into a crystalline state.

The recording layer 23 preferably has a uniform NaCl type structure when the recording layer is in the crystalline state, when the atomic ratio of each element of Ag, In and Sb as the main constituent element is expressed by the formula (2):

$$Ag\alpha In\beta Sb\gamma\text{-}\delta Te\delta \qquad (2)$$

(where, $0.1 < \alpha < 10$, $1 \leq \beta \leq 20$, $90 \leq \gamma \leq 100$, $\alpha+\alpha+\gamma=100$, and $0.2 \leq \delta \leq 0.35$).

Such NaCl type crystal structure has a tendency that it exhibits excellent initial and repetitive recording characteristics, preferably, when Ag, In, and Sb are positioned in an area corresponding to the Na site, and Te is positioned in an area corresponding to the Cl site, and when this Te is not 100% occupied by this site and has a hole.

With this arrangement, a eutectic composition is provided in which a composition change does not occur easily even when a recording is carried out by repeating the phase change between the amorphous phase and the crystalline phase. In order to achieve a high-speed crystallization at a higher linear velocity, it is preferable that Sb and In are increased and Ag is decreased while maintaining this state.

Further, regarding the crystallization speed, as Sb has a larger atomic radius than Te, and has a bond coordination number of about 3 to Te in the amorphous state, crystallization occurs very easily. As a result, the crystallization speed is fast, and the crystallization occurs at a relatively low temperature. Therefore, the preservation reliability is extremely poor when the Sb quantity is substantially large.

Further, In has a larger atomic radius than Sb, and has a bond coordination number of about 3.5 that is higher than the coordination number of Sb in the amorphous state. Therefore, the crystallization speed of In is fast. Crystallization of In occurs at a high speed at a higher temperature, and crystallization does not occur easily at room temperature to between 70 and 80° C. Although a detailed reason for this has not been known, it is considered that In may play a role of preventing crystallization based on Sb.

Further, regarding the crystallization speed, although the atomic radius of Ag is larger than that of Te, the crystallization speed of Ag is slower than that of Te, as the amorphous phase of Ag is more stable because Ag has a coordination number of approximately 2. In a high-speed recording, composition change does not occur easily even when a repetitive recording is carried out. Further, crystallization occurs at a high speed, and an optimum range of composition in which preservation reliability can be secured is obtained. However, there is a limit to this composition range in which it is possible to satisfy all characteristics. Particularly, it is difficult to secure the preservation reliability in a high-speed recording.

By taking the above facts into consideration, in order to secure excellent repetitive recording characteristic in a high-speed recording and environmental stability of the amorphous state from a viewpoint of securing reliability of the optical information recording medium, it is possible to suitably add at least one kind of element selected from the III-b group, the IV-b group, and the V-b group in the period law table, as additive elements to the above-described main constituent elements.

It is preferable that particularly these additive elements have bond energy to these constituent elements of 200 kJ/mol or above. Alternatively, in order to increase the crystallization speed, it is preferable that the atomic radius of these additive elements is 0.1 nm or above and not larger than 0.20 nm.

Further, it is desirable that this bond energy is as large as possible, and preferably 250 kJ/mol or above. When this value it too large, it requires large energy at the time of changing the phase. Therefore, it is preferable that the bond energy is 500 kJ/mol or below.

Further, there is a tendency that, in the III-b group, the IV-b group, and the V-b group in the periodic table, the element that has a smaller atomic weight has a higher crystallization temperature due to the addition. Therefore, from a viewpoint of preservation reliability, it is preferable that an element having a smaller atomic weight than that of the constituent elements Sb and In is suitably added.

Table 2A shows the atomic radius and bond energy to Te for each of the additive elements B, Al, Ti, C, Si, Ge, Sn, Pb, P, As, and Bi, and Table 2B shows the atomic radius and bond energy to Te for each of the constituent elements Ag, In, and Sb. From this table, as additive elements, it is preferable to suitably add Al, Si, Ge, Sn, and P, most preferably, Ge.

TABLE 2A

| ADDITIVE ELEMENTS X | BOND ENERGY kJ/mol | ATOMIC RADIUS nm |
|---|---|---|
| B | 350 | 0.085 |
| Al | 270 | 0.125 |
| Tl | <200 | 0.19 |
| C | <200 | 0.07 |
| Si | 450 | 0.11 |
| Ge | 460 | 0.125 |
| Sn | 360 | 0.145 |
| Pb | 250 | 0.18 |
| P | 300 | 0.1 |
| As | <200 | 0.115 |
| Bi | 230 | 0.16 |

TABLE 2B

| CONSTITUENT ELEMENTS | BOND ENERGY kJ/mol | ATOMIC RADIUS nm |
|---|---|---|
| Ag | 196 | 0.16 |
| In | 220 | 0.155 |
| Sb | 280 | 0.145 |

There is a tendency that crystallization speed is lowered and repetitive recording characteristic is degraded, when the additive quantity of these additive elements is too large. Further, an element that has a smaller atomic radius than that of In and Sb and that has bond energy has a large tendency of this. Therefore, it is desirable that the additive quantity is always smaller than the In quantity, within an optimum range of additive quantity. There is an element that extremely lowers the crystallization speed, particularly when the In quantity is always small. On the other hand, Ti, Pb, and Bi have an effect of increasing the crystallization speed. When the quantity of these elements is too large, there is a tendency that the crystallization temperature is lowered extremely, and the preservation reliability is lowered, despite a satisfactory repetitive recording characteristic.

Further, when the recording layer 23 having a composition as described above is used in the optical information recording medium, the lower protection layer 22 and the upper protection layer 24 may be made from ZnS and SiO, and that has a mol ratio of ZnS:SiO within a range from 50:50 to 90:10, preferably, near a mol ratio of 80:20. According to the needs, it is possible to suitably use an oxide, a nitride, or a mixture of these, other than a composite of a ZnS—SiO system.

It is desirable that the lower protection layer 22 has a thickness between 25 and 250 nm, from a viewpoint of a function of protecting the recording layer 23 from the environment, and preventing the recording layer 23 from being separated from the substrate 21 due to a relaxation of stress attributable to the heat at the time of a film formation. Further, it is desirable that the upper protection layer 24 has a thickness between 5 and 25 nm, from a viewpoint of restricting deformation and reduction in close adhesiveness due to an increase in thermal stress at the time of a repetitive recording, and preventing the thermal conductivity from lowering the recording sensitivity at the time of the recording.

The reflection layer 25 may be made from metal like Al or Ag, or an alloy of these. It is needless to say that, material having low cost are preferable. When necessary, a metal having a higher thermal conductivity than that of the protection layer 24, and an alloy of this metal can be suitably used. The reflection layer 25 has a thickness between 50 and 200 nm.

The optical information recording medium according to the second embodiment is suitable for use as a rewritable recording medium capable of recording and reproduction using a wavelength 400 and 680 nm. In order to increase the recording density of this recording medium, the aperture rate of the objective lens is set to 0.60 or above.

Usually, recording can be carried out in two ways. First, carrying out recording on the grooves formed on the substrate, second, carrying out recording on the tracks between grooves formed on the substrate. In any case, it is possible to narrow the track pitch so as to increase the density and or the memory capacity. It is better that the track pitch is 0.8 μm or lesser. Moreover, it is better that the depth of the groove is between 15 to 60 nm. It is possible to stably perform tracking when the groove is 15 nm or more deep.

Figure 5:
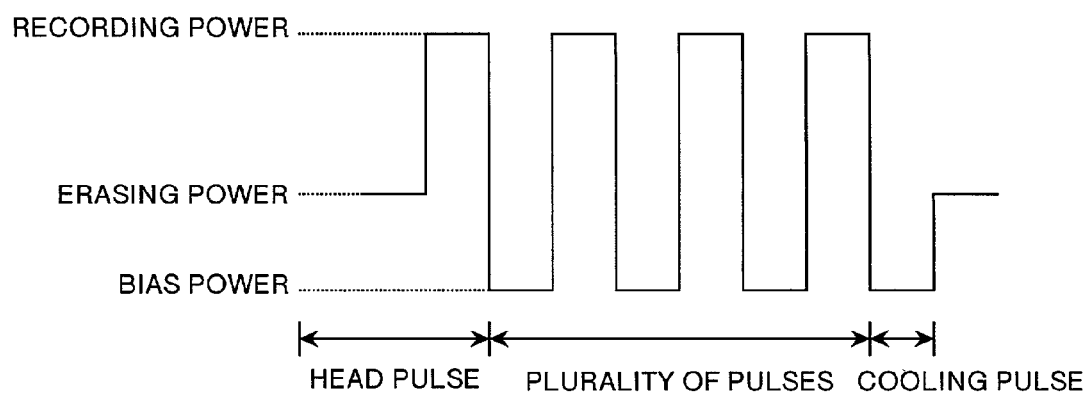
FIG. 5 is a conceptual diagram of a recording pulse waveform of a phase change type recording medium provided with a recording layer according to a second embodiment of the invention.

The recording/reproducing characteristic of the optical information recording/reproducing medium according to the second embodiment are shown in FIG. 5. As is clear from FIG. 5, a light emission pulse of a laser beam irradiated onto a recording medium has three levels of recording, erasing, and bias. Further, recording and erasing power is set higher than reproduction power. Bias power is set lower than reproduction power. The bias power is power after irradiating the recording power, and this is necessary for forming an amorphous phase. This pulse further consists of a head pulse (one pulse), a plurality of pulse strings, and a cooling pulse (one pulse). This pulse is necessary for making sharp an edge of a recording mark, and for making accurate a position of recording and a length of a recorded mark. This kind of recording light-emission pulse is suitable for a high-speed recording, and optimizes a material and a composition of a recording layer.

As a result, the recording frequency is about 20 MHz to 80 MHz, and maximum recording power is 150 nW. The recording and reproducing linear velocity corresponds to both CLV and CAV. The maximum linear velocity has been about 15 m/s, preferably 3.0 m/s to 12 m/s.

Concrete examples of the second embodiments will be explained below as examples 21 to 42. However, the second embodiment is not limited to these examples.

A polycarbonate substrate 21 of thickness 0.6 mm was used. Groove was formed on this substrate 21. This grove had a pitch 0.74 μm, width 0.3 μm, and depth 35 μm. On this substrate 21, following layers were laminated using the sputtering method. That is, the lower protection layer 22, recording layer 23, upper protection layer 24, and the reflection layer 25 were formed on the substrate 21. The lower protection layer 22 is a protection film having a mol composition ratio (mol %) of ZnS:SiO=80:20. The lower protection layer 22 had a thickness of 75 nm. Table 3 lists the composition ratios (atomic percentages) of the constituent elements and the additive elements etc. of the recording layer 23 of the Examples 21 to 42 and Comparative Examples 1 to 4. The recording layer 23 had a thickness of 20 nm.

TABLE 3

| | CONSTITUENT ELEMENTS (at %) | | | | ADDITIVE ELEMENTS | ADDITIVE QUANTITY (at %) | RECORDING LINEAR VELOCITY (m/s) | INCREASE IN JITTER QUANTITY AFTER REPETITIVE RECORDING % | INCREASE IN JITTER QUANTITY AFTER PRESERVATION TEST % |
|---|---|---|---|---|---|---|---|---|---|
| | Ag | In | Sb | Te | | | | | |
| EXAMPLE 21 | 0.5 | 5 | 69.9 | 24.5 | N | 0.1 | 8 | 2 | 3.5 |
| EXAMPLE 22 | 0.5 | 5 | 69.8 | 24.5 | | 0.2 | 7.5 | 1.5 | 4.5 |
| EXAMPLE 23 | 2 | 3 | 68 | 26 | Pb | 1 | 8 | 1.5 | 3 |
| EXAMPLE 24 | 0.5 | 6.5 | 69 | 22 | | 2 | 11 | 3 | 5 |
| EXAMPLE 25 | 2 | 3 | 68 | 26 | Bi | 1 | 7.5 | 1.5 | 3 |
| EXAMPLE 26 | 0.5 | 6.5 | 69 | 22 | | 2 | 10.5 | 3 | 4 |
| EXAMPLE 27 | 0.5 | 5.5 | 70 | 22 | Al | 2 | 9 | 4 | 3 |
| EXAMPLE 28 | 0.5 | 5.5 | 69 | 22 | | 3 | 8.5 | 4.5 | 4.5 |
| EXAMPLE 29 | 0.5 | 5.5 | 69.5 | 23.5 | | 1 | 7.5 | 3 | 3 |
| EXAMPLE 30 | 0.5 | 4 | 69 | 24.5 | | 2 | 7 | 2 | 4.5 |
| EXAMPLE 31 | 0.5 | 5 | 70.5 | 23 | Ge | 1 | 8 | 1.5 | 1 |
| EXAMPLE 32 | 0.5 | 5.5 | 69 | 23 | | 2 | 7.5 | 1 | 0.5 |
| EXAMPLE 33 | 0.5 | 4.5 | 71 | 22 | | 2 | 10 | 2 | 1 |
| EXAMPLE 34 | 1 | 4 | 70 | 22 | | 3 | 9.5 | 2 | 1 |
| EXAMPLE 35 | 0.5 | 5.5 | 70 | 22 | Si | 2 | 8 | 2 | 3 |
| EXAMPLE 36 | 0.5 | 4 | 70 | 22.5 | | 3 | 7 | 1 | 4 |
| EXAMPLE 37 | 0.5 | 5 | 71 | 22.5 | | 1 | 8 | 2.5 | 3.5 |
| EXAMPLE 38 | 0.5 | 4 | 70 | 23.5 | | 2 | 7.5 | 2 | 4 |
| EXAMPLE 39 | 0.5 | 6 | 70 | 22.5 | Sn | 1 | 8.5 | 3 | 4 |
| EXAMPLE 40 | 0.5 | 5.5 | 70 | 22 | | 2 | 7.5 | 3 | 4 |
| EXAMPLE 41 | 1.5 | 4 | 69 | 24.5 | | 1 | 7 | 2 | 4 |
| EXAMPLE 42 | 0.5 | 4.5 | 69.5 | 23.5 | | 2 | 7.5 | 1.5 | 3 |
| COMPARATIVE EXAMPLE 1 | 0.5 | 5 | 70 | 24.5 | NON | | 8.5 | 3 | 4 |
| COMPARATIVE EXAMPLE 2 | 0.5 | 6.5 | 71 | 22 | | | 9.5 | 5 | 4 |
| COMPARATIVE EXAMPLE 3 | 2 | 3 | 69 | 26 | | | 7 | 2 | 5 |
| COMPARATIVE EXAMPLE 4 | 1 | 5 | 72 | 22 | | | 11 | 5 | 6 |

The upper protection layer 23 is a protection film having a mol composition ratio (mol %) of ZnS:SiO=80:20 in the same manner as the lower protection layer 23. The upper protection layer 23 had a thickness of 15 nm. The reflection layer 25 is made from Al alloy. The reflection layer 25 had a thickness of 120 nm. Further, a substrate coated with an ultraviolet-ray-cured resin and having no layers is adhered on the reflection layer 25 to obtained the optical information recording medium according to the second embodiment. This optical information recording medium had a thickness of 1.2 mm.

Next, after initialization under a predetermined condition using LD, the recording layer 23 was made crystalline. For recording and reproduction, a pick-up head having a wavelength 655 nm, and an objective lens NA 0.65 has been used, and recording was carried out on each recording layer by CLV at a linear velocity shown in Table 3, in a recording density 0.265 µm/bit.

A modulation system of recording data has been (8, 16) modulation. Maximum recording power has been 15 mW, and erasing power has been 0.45 to 0.55 times the recording power. Bias power has been 0.5 mW, and reproduction power has been set to 0.8 mW.

Under the above conditions, an increase in the jitter quantity after repetitively recording 10,000 times from the jitter quantity of one recording, and an increase in the jitter after 1,000 hours at 80° C. and 85% RH have been measured. The jitter is a value expressed in % obtained by dividing it by a window width.

It can be seen from Table 3, in the Examples 21 to 42 show improved preservation reliability without decreasing the number of repetitive recording in comparison with the Comparative Examples 1 to 4. These Comparative Examples 1 to 4 represent the media obtained with the conventional technique, i.e. where additive elements have not been added. Particularly, when Ge in the quantity of 2 atomic percentage is added as the additive element, it can be understood that the repetitive number is satisfactory, and the reliability is particularly improved. Further, in the recording layer that uses Ag, In, Sb and Te as main constituent elements, when an additive quantity of these additive elements is optimized, it becomes possible to achieve a higher-speed recording. Therefore, there is an effect that it is possible to improve the repetitive recording characteristic, and improve the preservation reliability.

Thus, the phase change type optical information recording medium according to the second embodiment is characterized in that the recording layer 23 is prepared by having an additional element X selected from the III-b group, the IV-b group, and the V-b group in the period law table that satisfies a specific condition, added to the AgInSbTe system of the main constituent elements, such that a relational expression of an atomic composition ratio of $(Ag\alpha In\beta Sb\gamma X\epsilon)_{1-\delta}Te_\delta$ is satisfied.

With the above arrangement, it is possible to provide an optical information recording medium having high reliability, capable of achieving a recording in high density and at high linear velocity, without degrading characteristics when a recording is carried out repeatedly, as compared with the conventional optical information recording medium.

It is expected that this phase change type optical information recording medium that can exhibit the above characteristics can be applied to a large-capacity optical file, a digital video disk, etc.

Next, an optical information recording medium according to the third embodiment of the invention will be explained. The structure of this optical information recording medium is same as the optical information recording medium according to the second embodiment. In other words, as shown in FIG. 6, following layers are successively laminated on the substrate 21. That is, the lower protection layer 22, recording layer 23, upper protection layer 24, and the reflection layer 25 are laminated on the substrate 21. The lower protection layer 22 and the upper protection layer 24 consist of a dielectric. It should be notated that, although the protection layers 22 and 24 have been provided on both sides of the recording layer 23, only the lower protection layer 22 or the upper protection layer 24 may be provided. However, when the substrate 21 is made of a material having low thermal resistance like a polycarbonate resin, it is desirable to provide the lower protection layer 22.

The substrate 21 is usually formed from glass, ceramics or a resin. From a viewpoint of moldability and cost, a resin substrate is preferable. As representative examples of resins, there are polycarbonate resin, acrylic resin, epoxy resin, polystyrene resin, acrylonitrile-styrene copolymer resin, polyethylene resin, polypropylene resin, silicone resin, fluororesin, ABS resin, and urethane resin. From a viewpoint of moldability and the optical characteristic, the polycarbonate resin is preferable. The shape of the substrate 21 is not limited to a disk shape, and this may be a card shape or a sheet shape.

The protection layers 22 and 24 may be formed by film-forming using $(ZnS)_{80} \cdot (SiO_2)_{20}$ using the sputtering method. These protection layers 22 and 24 has a function as the heat-resisting protection layer and a function as a light-interfering layer. Therefore, it is necessary to utilize these functions to a maximum extent. For this purpose, each of the protection layers 22 and 24 had a thickness between 200 Å and 3,000 Å, and preferably between 350 Å and 2,000 Å. The protection layers 22 and 24 function as heat-resistant when they are thicker than 200 Å. Moreover, when the protection layers 22 and 24 are thinner than 3,000 Å, then the interface separation does not occur easily.

The recording layer 23 is formed using the sputtering method. The recording layer 23 should have a thickness between 100 Å and 1,000 Å, and preferably between 200 Å and 350 Å. When the recording layer 23 is thicker than 100 Å, the light-absorptance is maintained, and the function as the recording layer is not lost. On the other hand, when the recording layer 23 is thinner than 1,000 Å, the quantity of a transmission beam is maintained, and therefore, excellent interference effect can be obtained. The reflection layer 25 is made from, for example, an Al alloy using the sputtering method. The reflection layer 25 has a thickness between 500 Å and 2,000 Å, and preferably between 700 Å and 1,500 Å.

The third embodiment will be explained in further detail based on the Examples 51 to 55.

EXAMPLE 51

A polycarbonate substrate 21 of thickness 0.6 mm and diameter 120 m was used. Groove was formed on this substrate 21. This grove had a pitch 0.7 μm, and depth 600 Å. On this substrate 21, following layers were laminated using the sputtering method. That is, the lower protection layer 22, recording layer 23, upper protection layer 24, and the reflection layer 25 thereby obtaining the optical information recording medium.

The protection layers 22 and 24 were made from $(ZnS)_{80} \cdot (SiO_2)_{20}$. The lower protection layer 22 had a thickness of 1,200 Å, and the upper protection layer 24 had a thickness of 350 Å. The reflection layer 25 was made from Al—Ti alloy. The reflection layer 25 had a thickness of 800 Å.

The recording layer 23 had a thickness of 210 Å, this has been DC sputtered under the following sputtering condition. A target composition ratio of the recording layer is $Ag_5In_7Sb60Te_{28}$.

(1) input power: 0.5 kW
(2) gas flow rate: Ar, 15 sccm
(3) gas pressure for forming a film: 1.0 mTorr
(4) substrate temperature: starts at 25° C., and raises temperature at the rate of 30° C./min.

In order to analyze a structure of a recording layer of the optical information recording medium obtained, a glass substrate for the analysis has been prepared separately. Initial crystallization of the recording layer has been carried out using a high-output semiconductor laser. For analyzing a structure of the recording layer, particularly, for analyzing a coordination number of a constituent element of the phase change type recording material, and a crystal structure, there have used an X-ray analysis, an electron beam analysis, and EXAPS (extended X-ray absorption fine structure). Table 4 shows the result of this analysis.

TABLE 4

| ELEMENT | COORDINATION NUMBER (CORRESPONDING TO TE) | | CRYSTALLINE STRUCTURE | HOLE RATE OF Te (%) |
| --- | --- | --- | --- | --- |
| | AMORPHOUS STATUS | CRYSTALLINE STATUS | | |
| Ag | 1.8 | 4.1 | NaCl TYPE | 66 |
| In | 3.5 | 3.8 | | |
| Sb | 2.9 | 2.4 | | |

Figure 7:
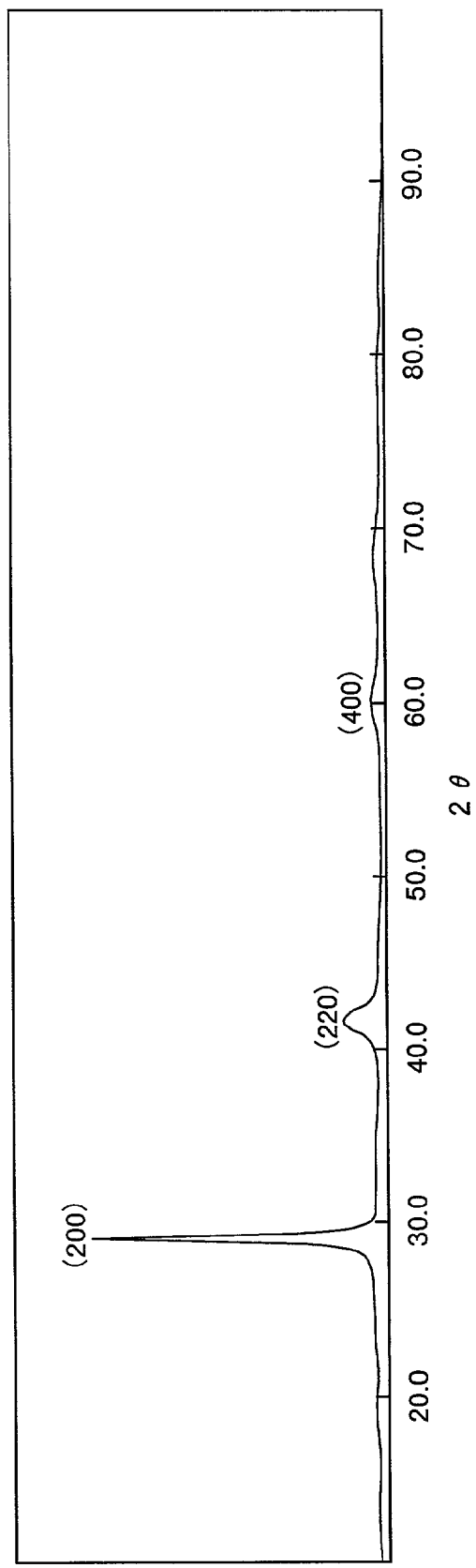
FIG. 7 is an explanatory diagram of an X-ray diffraction spectrum showing a result of a structural analysis of a recording layer of an optical information recording medium manufactured in an example 51.

Regarding signal characteristics of the optical information recording medium, a light source of a wavelength 635 nm has been used, and a repetitive recording of overwriting has been carried out at a recording linear velocity 3.5 m/s and in an EFM random pattern. An evaluation has been carried out based on recording power dependency of jitter of a 3T signal at that time. A linear velocity during a reproduction has been set to 3.5 m/s. Table 5 shows a result of the evaluation. FIG. 7 shows the X-ray diffraction spectrum.

TABLE 5

| RECORDING POWER (mW) JITTER (ns) NUMBER OF OVERWRITING | 8 | 9 | 10 | 11 | 12 | 13 |
| --- | --- | --- | --- | --- | --- | --- |
| 1 | 8.5 | 8.3 | 8.0 | 7.8 | 7.7 | 7.6 |
| 1000 | 8.5 | 8.4 | 8.2 | 8.0 | 8.0 | 7.9 |
| 3000 | 8.7 | 8.6 | 8.5 | 8.3 | 8.4 | 8.4 |
| 5000 | 8.8 | 8.8 | 8.8 | 8.8 | 8.9 | 8.9 |
| 10000 | 9.0 | 9.0 | 9.1 | 9.1 | 9.2 | 9.3 |
| 15000 | 9.3 | 9.3 | 9.4 | 9.5 | 9.6 | 9.8 |
| 20000 | 9.6 | 9.6 | 9.8 | 9.9 | 10.1 | 10.3 |

In Table 5, numbers 8, 9, 10, 11, 12, and 13 in the horizontal direction respectively represent recording power in nW. Moreover, numbers 1, 1000, 3000, 5000, 10000, 15000, 20000 in the vertical direction represent how may times overwriting has been performed ("numbers of overwriting"). Furthermore, the other values in this table represent jitter in ns. Same is the case for the Tables 7, 9, 11, 13, 15, 17.

EXAMPLE 52

Figure 8:
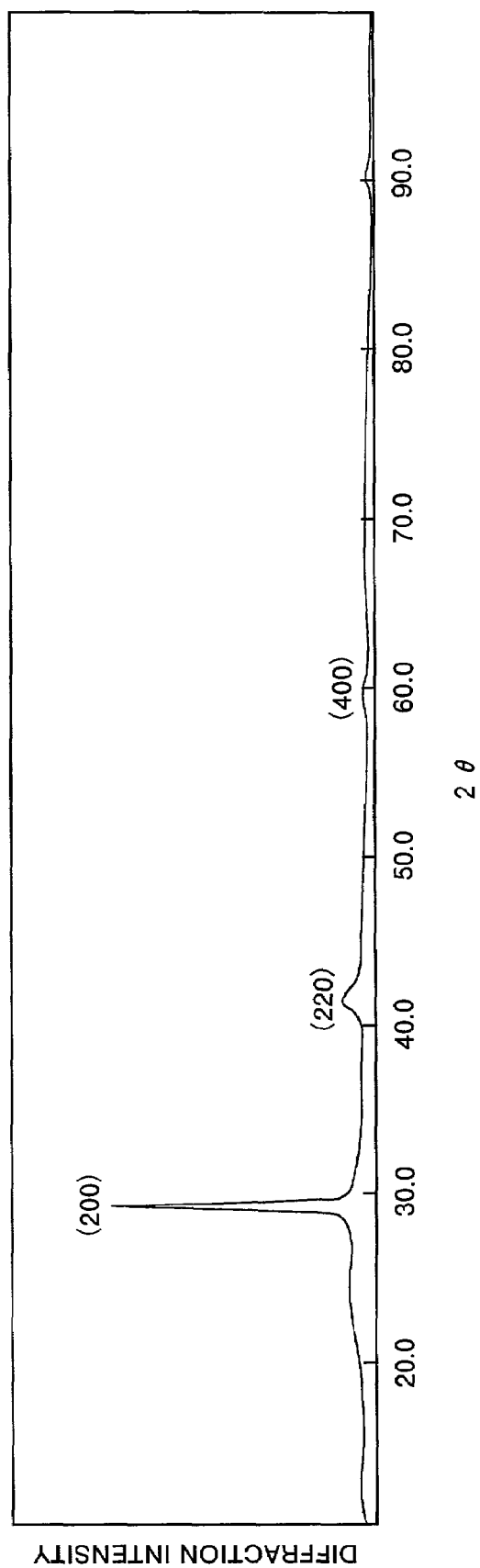
FIG. 8 is an explanatory diagram of an X-ray diffraction spectrum showing a result of a structural analysis of a recording layer of an optical information recording medium manufactured in an example 52.

An optical information recording medium has been prepared exactly in the same manner as that of the Example 51, except that a substrate temperature has started at 25° C. and the temperature has been raised at a rate of 10° C./min as a condition for forming the recording layer 23. Table 6 shows the result of analysis of the structure of the recording layer 23 in Example 52, Table 7 shows the signal characteristics, and FIG. 8 shows the X-ray diffraction spectrum.

TABLE 6

| ELEMENT | AMORPHOUS STATUS | CRYSTALLINE STATUS | CRYSTALLINE STRUCTURE | HOLE RATE OF Te (%) |
|---|---|---|---|---|
| | COORDINATION NUMBER (CORRESPONDING TO TE) | | | |
| Ag | 1.7 | 4.0 | NaCl TYPE | 65 |
| In | 3.3 | 3.6 | | |
| Sb | 2.8 | 2.2 | | |

TABLE 7

| RECORDING POWER (mW) NUMBER OF OVERWRITING / JITTER (ns) | 8 | 9 | 10 | 11 | 12 | 13 |
|---|---|---|---|---|---|---|
| 1 | 8.5 | 8.2 | 8.0 | 7.9 | 7.8 | 7.7 |
| 1000 | 8.5 | 8.3 | 8.2 | 8.1 | 8.0 | 7.9 |
| 3000 | 8.7 | 8.6 | 8.5 | 8.4 | 8.4 | 8.3 |
| 5000 | 8.9 | 8.8 | 8.8 | 8.8 | 8.9 | 8.9 |
| 10000 | 9.1 | 9.1 | 9.2 | 9.2 | 9.3 | 9.4 |
| 15000 | 9.4 | 9.4 | 9.5 | 9.6 | 9.7 | 9.8 |
| 20000 | 9.7 | 9.7 | 9.8 | 10.1 | 10.2 | 10.4 |

EXAMPLE 53

Figure 9:
FIG. 9 is an explanatory diagram of an X-ray diffraction spectrum showing a result of a structural analysis of a recording layer of an optical information recording medium manufactured in an example 53.

An optical information recording medium has been prepared exactly in the same manner as that of the Example 51, except that a substrate temperature has started at 25° C. and the temperature has been raised at a rate of 50° C./min as a condition for forming the recording layer 23. Table 8 shows the result of analysis of the structure of the recording layer 23 in Example 53, Table 9 shows the signal characteristics, and FIG. 9 shows the X-ray diffraction spectrum.

TABLE 8

| ELEMENT | AMORPHOUS STATUS | CRYSTALLINE STATUS | CRYSTALLINE STRUCTURE | HOLE RATE OF Te (%) |
|---|---|---|---|---|
| | COORDINATION NUMBER (CORRESPONDING TO TE) | | | |
| Ag | 2.0 | 4.3 | NaCl TYPE | 67 |
| In | 3.6 | 4.0 | | |
| Sb | 3.1 | 2.6 | | |

TABLE 9

| RECORDING POWER (mW) NUMBER OF OVERWRITING / JITTER (ns) | 8 | 9 | 10 | 11 | 12 | 13 |
|---|---|---|---|---|---|---|
| 1 | 8.3 | 8.2 | 7.9 | 7.7 | 7.6 | 7.5 |
| 1000 | 8.4 | 8.3 | 8.1 | 7.9 | 7.9 | 7.8 |
| 3000 | 8.6 | 8.5 | 8.4 | 8.2 | 8.2 | 8.3 |
| 5000 | 8.7 | 8.7 | 8.6 | 8.6 | 8.7 | 8.7 |
| 10000 | 8.9 | 8.9 | 8.9 | 9.0 | 9.1 | 9.2 |
| 15000 | 9.2 | 9.2 | 9.3 | 9.4 | 9.5 | 9.7 |
| 20000 | 9.5 | 9.5 | 9.7 | 9.8 | 10.0 | 10.2 |

EXAMPLE 54

Figure 10:
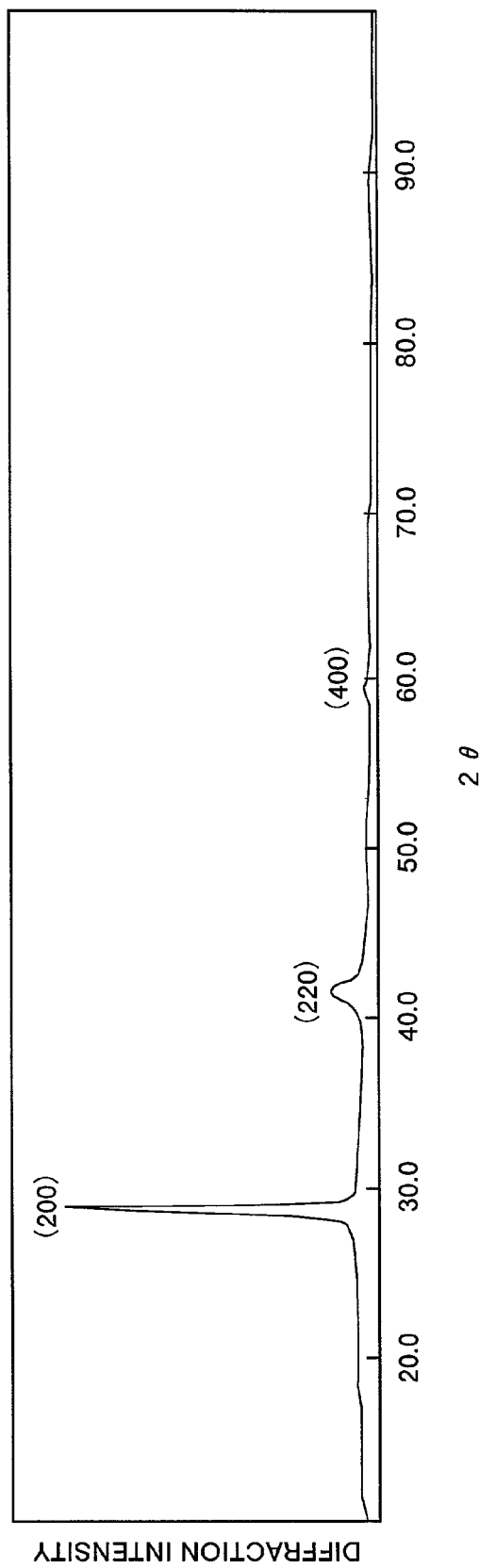
FIG. 10 is an explanatory diagram of an X-ray diffraction spectrum showing a result of a structural analysis of a recording layer of an optical information recording medium manufactured in an example 54.

An optical information recording medium has been prepared exactly in the same manner as that of the Example 51, except that a target composition of the recording layer 23 was taken to be $Ag_3In_{10}Sb_{63}Te_{24}$. Table 10 shows the result of analysis of the structure of the recording layer 23 in Example 54, Table 11 shows the signal characteristics, and FIG. 10 shows the X-ray diffraction spectrum.

TABLE 10

| ELEMENT | AMORPHOUS STATUS | CRYSTALLINE STATUS | CRYSTALLINE STRUCTURE | HOLE RATE OF Te (%) |
|---|---|---|---|---|
| | COORDINATION NUMBER (CORRESPONDING TO TE) | | | |
| Ag | 1.5 | 3.8 | NaCl TYPE | 69 |
| In | 3.4 | 3.6 | | |
| Sb | 2.7 | 2.3 | | |

TABLE 11

| RECORDING POWER (mW) NUMBER OF OVERWRITING / JITTER (ns) | 8 | 9 | 10 | 11 | 12 | 13 |
|---|---|---|---|---|---|---|
| 1 | 8.4 | 8.3 | 8.1 | 7.8 | 7.7 | 7.6 |
| 1000 | 8.4 | 8.4 | 8.2 | 8.0 | 8.0 | 7.9 |
| 3000 | 8.6 | 8.6 | 8.4 | 8.3 | 8.3 | 8.3 |
| 5000 | 8.8 | 8.8 | 8.7 | 8.7 | 8.7 | 8.8 |
| 10000 | 9.0 | 9.0 | 9.0 | 9.1 | 9.2 | 9.3 |
| 15000 | 9.3 | 9.3 | 9.4 | 9.5 | 9.6 | 9.8 |
| 20000 | 9.6 | 9.6 | 9.8 | 9.9 | 10.1 | 10.3 |

EXAMPLE 55

Figure 11:
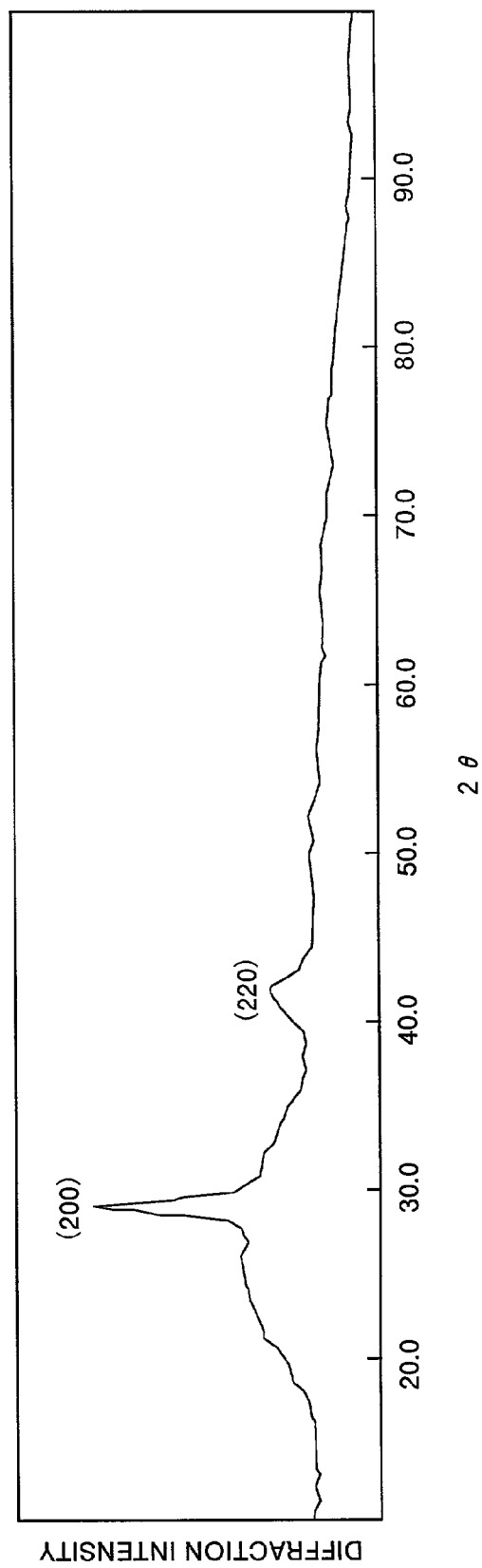
FIG. 11 is an explanatory diagram of an X-ray diffraction spectrum showing a result of a structural analysis of a recording layer of an optical information recording medium manufactured in an example 55.

An optical information recording medium has been prepared exactly in the same manner as that of the Example 51, except that a target composition of the recording layer 23 was taken to be $Ag_8In_3Sb_{68}Te_{21}$. Table 12 shows the result of analysis of the structure of the recording layer 23 in Example 55, Table 13 shows the signal characteristics, and FIG. 11 shows the X-ray diffraction spectrum.

TABLE 12

| ELEMENT | COORDINATION NUMBER (CORRESPONDING TO TE) | | CRYSTALLINE STRUCTURE | HOLE RATE OF Te (%) |
|---|---|---|---|---|
| | AMORPHOUS STATUS | CRYSTALLINE STATUS | | |
| Ag | 1.8 | 3.9 | NaCl TYPE | 73 |
| In | 3.1 | 3.7 | | |
| Sb | 2.7 | 2.5 | | |

TABLE 13

| RECORDING POWER (mW) JITTER (ns) NUMBER OF OVERWRITING | 8 | 9 | 10 | 11 | 12 | 13 |
|---|---|---|---|---|---|---|
| 1 | 8.4 | 8.3 | 8.2 | 7.9 | 7.8 | 7.7 |
| 1000 | 8.4 | 8.4 | 8.2 | 8.1 | 8.1 | 8.0 |
| 3000 | 8.6 | 8.6 | 8.4 | 8.4 | 8.4 | 8.4 |
| 5000 | 8.8 | 8.8 | 8.7 | 8.8 | 8.8 | 8.9 |
| 10000 | 9.0 | 9.0 | 9.0 | 9.2 | 9.3 | 9.4 |
| 15000 | 9.3 | 9.3 | 9.4 | 9.6 | 9.7 | 9.9 |
| 20000 | 9.6 | 9.6 | 9.8 | 9.9 | 10.1 | 10.3 |

COMPARATIVE EXAMPLE 51

Figure 12:
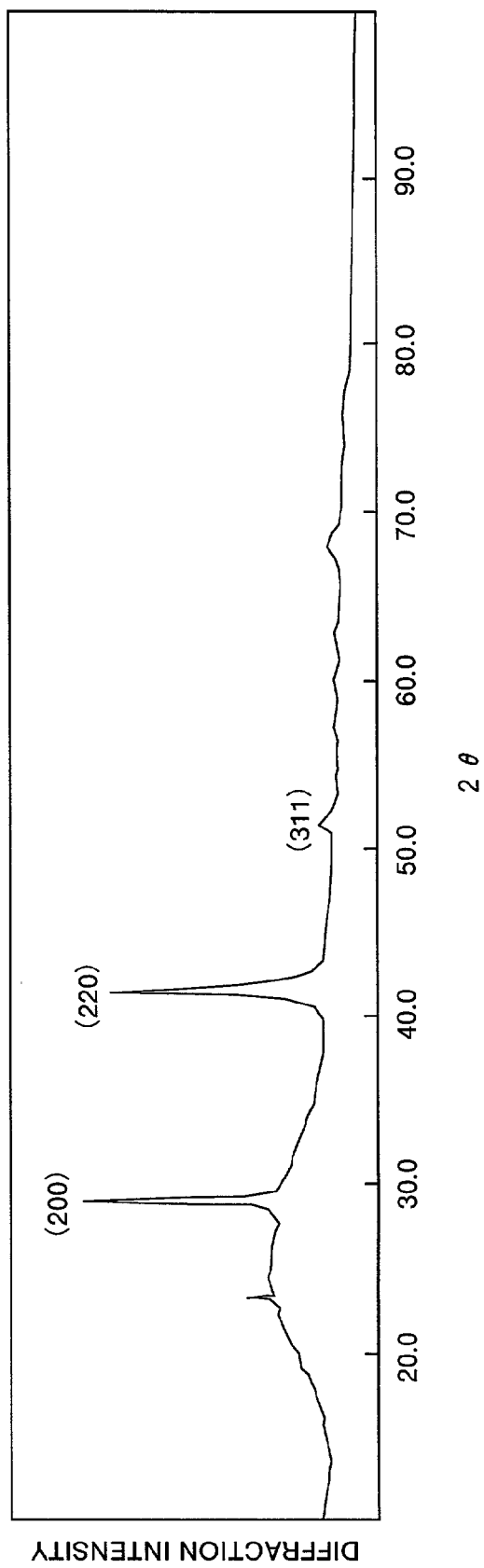
FIG. 12 is an explanatory diagram of an X-ray diffraction spectrum showing a result of a structural analysis of a recording layer of an optical information recording medium manufactured in a comparative example 51.

An optical information recording medium has been prepared exactly in the same manner as that of the Example 51, except that a film has been formed using power 850 W without raising temperature of the substrate at the time of forming a film. Table 14 shows the result of analysis of the structure of the recording layer 23 in Comparative Example 51, Table 15 shows the signal characteristics, and FIG. 12 shows the X-ray diffraction spectrum.

TABLE 14

| ELEMENT | COORDINATION NUMBER (CORRESPONDING TO TE) | | CRYSTALLINE STRUCTURE | HOLE RATE OF Te (%) |
|---|---|---|---|---|
| | AMORPHOUS STATUS | CRYSTALLINE STATUS | | |
| Ag | 1.9 | 2.0 | NaCl TYPE | 66 |
| In | 3.7 | 3.7 | | |
| Sb | 3.1 | 3.1 | | |

TABLE 15

| RECORDING POWER (mW) JITTER (ns) NUMBER OF OVERWRITING | 8 | 9 | 10 | 11 | 12 | 13 |
|---|---|---|---|---|---|---|
| 1 | 8.8 | 8.7 | 8.6 | 8.6 | 8.5 | 8.3 |
| 1000 | 9.0 | 9.0 | 8.9 | 9.0 | 9.0 | 9.0 |
| 3000 | 9.4 | 9.5 | 9.5 | 9.5 | 9.6 | 9.6 |
| 5000 | 9.9 | 10.0 | 10.0 | 10.1 | 10.2 | 10.3 |
| 10000 | 10.5 | 10.7 | 10.8 | 10.9 | 11.1 | 11.3 |
| 15000 | 11.5 | 11.8 | 12.0 | 12.2 | 12.8 | 13.1 |
| 20000 | 13.1 | 13.5 | 13.8 | 14.1 | 15.1 | 15.9 |

COMPARATIVE EXAMPLE 52

Figure 13:
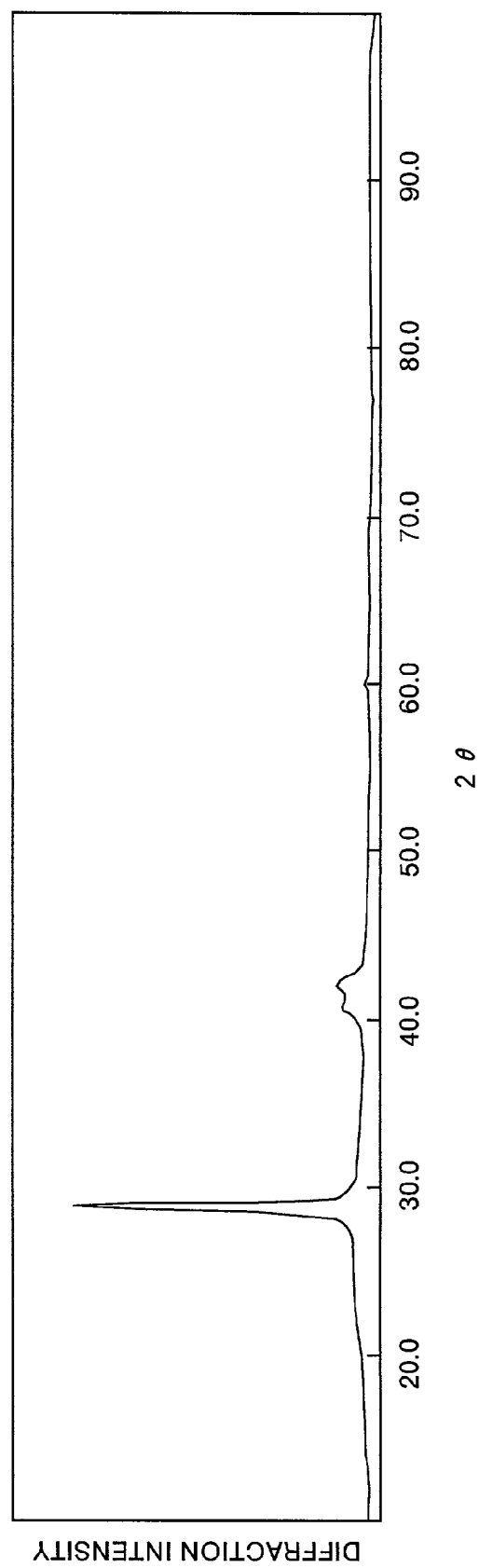
FIG. 13 is an explanatory diagram of an X-ray diffraction spectrum showing a result of a structural analysis of a recording layer of an optical information recording medium manufactured in a comparative example 52.

An optical information recording medium has been prepared exactly in the same manner as that of the Example 51, except that a film has been formed using power 200 W without raising temperature of the substrate at the time of forming a film. Table 16 shows the result of analysis of the structure of the recording layer 23 in Comparative Example 52, Table 17 shows the signal characteristics, and FIG. 13 shows the X-ray diffraction spectrum.

TABLE 16

| ELEMENT | COORDINATION NUMBER (CORRESPONDING TO TE) | | CRYSTALLINE STRUCTURE | HOLE RATE OF Te (%) |
|---|---|---|---|---|
| | AMORPHOUS STATUS | CRYSTALLINE STATUS | | |
| Ag | 1.2 | 1.2 | UNKNOWN | 69 |
| In | 3.1 | 3.2 | | |
| Sb | 3.1 | 3.0 | | |

TABLE 17

| RECORDING POWER (mW) JITTER (ns) NUMBER OF OVERWRITING | 8 | 9 | 10 | 11 | 12 | 13 |
|---|---|---|---|---|---|---|
| 1 | 9.1 | 9.1 | 9.0 | 8.8 | 8.7 | 8.6 |
| 1000 | 9.5 | 9.5 | 9.4 | 9.3 | 9.3 | 9.2 |
| 3000 | 9.9 | 9.9 | 9.9 | 9.8 | 9.9 | 9.9 |
| 5000 | 10.3 | 10.2 | 10.2 | 10.3 | 10.4 | 10.5 |
| 10000 | 11.1 | 11.3 | 11.4 | 11.7 | 12.1 | 12.6 |
| 15000 | 15.1 | 15.7 | 15.9 | 16.1 | 16.8 | 17.4 |
| 20000 | — | — | — | — | — | — |

As is clear from Table 4 to Table 13 and FIG. 7 to FIG. 11, the Examples 51 to 55 are characterized in that a structure of the recording layer 23 is NaCl type, and reflection from (200) surface is strong.

Further, bond coordination numbers of Ag, In and Sb to Te are as follows.

(1) In the case of Ag: When Ag is in an amorphous state, a coordination number is 1.5 and 2.0 although there is a difference depending on a film-forming condition. When Ag is in a crystalline state, a coordination number is between 3.8 and 4.3. As a result, the coordination number in the crystalline state is larger than the coordination number in the amorphous state.

(2) In the case of In: When In is in an amorphous state, the coordination number is between 3.1 and 3.6. When In is in a crystalline state, the coordination number is 3.6 and 4.0. As a result, like the case of Ag, the coordination number in the crystalline state is larger than the coordination number in the amorphous state.

(3) In the case of Sb: When Sb is in an amorphous state, the coordination number is between 2.7 and 3.1. When Sb is in a crystalline state, the coordination number is 2.2 and 2.6. As a result, the coordination number in the amorphous state is larger than the coordination number in the crystalline state.

Signal characteristics of the optical information recording media in the Examples 51 to 55 are all satisfactory. It is possible to carry out the recording using power within a large range from 8 mW to 13 mW. Further, it is possible to carry out the recording with high sensitivity. Further, the optical information recording medium has extremely satisfactory repetitive recording characteristic, as it is possible to use the optical information recording medium by about 20 thousand times. Regarding the preservation characteristic, it has been confirmed that the optical information recording medium has higher weatherability as the signal characteristic is not degraded even after the optical information recording medium has been left for 200 hours under a temperature condition of 80% RH·80° C.

In the mean time, in the Examples 51 and 52, a bond coordination number of Ag in the amorphous state is not different from that in the crystalline state. Particularly, it can be understood that a bond coordination number is small in a crystalline state. Although it is not clear why a result of the comparative example is different from that of the example due to a difference in a film-forming condition, a difference is recognized between the X-ray diffraction spectrum of the Examples 51 and 52 and that of the Examples 51 to 55. In other words, although the Comparative Example 51 is an NaCl type as is the same with the Examples 51 to 55, the (220) surface is strong and there is a growth in the (311) surface. In the Comparative Example 52, it appears that the (220) surface is separated into two. The difference between the X-ray diffraction spectrum of the Examples 51 and 52 and that of the Examples 51 to 55 also appears in the signal characteristic of the optical information recording medium obtained. In other words, in the Comparative Examples 51 and 52, a reduction in the sensitivity in comparison to the Examples 51 to 55 is observed. The repetitive recording characteristic is also lowered large. This indicates that the structure of the recording layer 23, particularly, the bond coordination number, has a great influence over the signal characteristic of the optical information recording medium.

Figure 14:
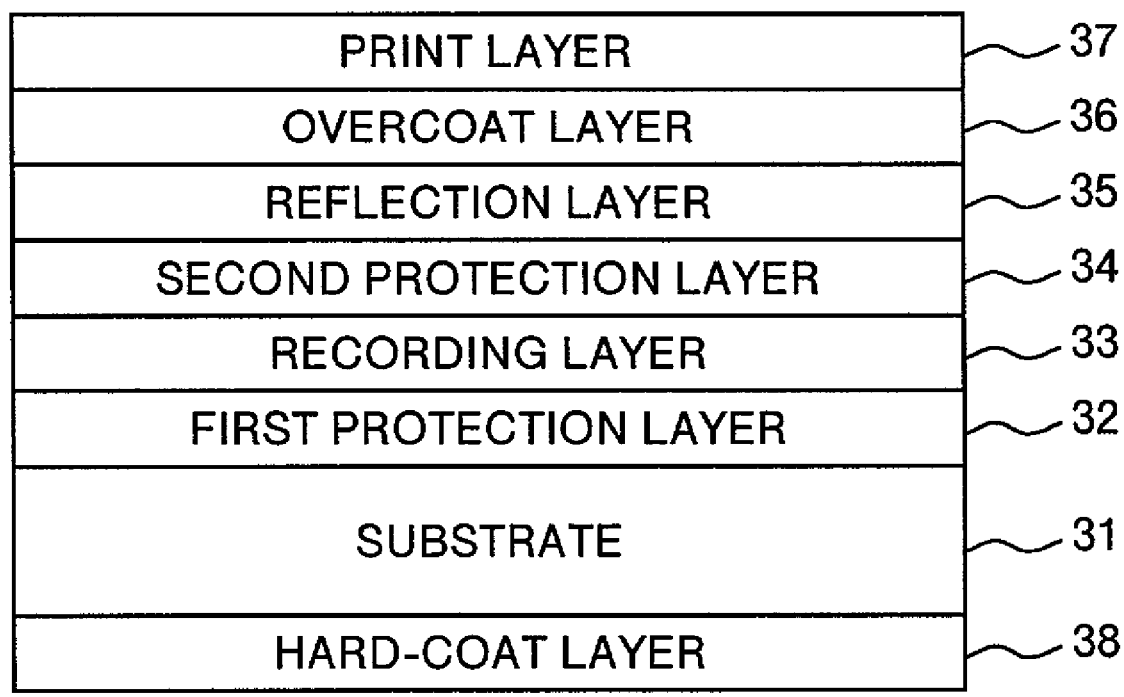
FIG. 14 is a diagram for explaining one example of an optical information recording medium according to a fourth embodiment of the invention.

An optical information recording medium according to the fourth embodiment will be explained here. FIG. 14 shows a cross-section of one example of the optical information recording medium according to the fourth embodiment. As a basic structure, on the substrate 31 having a guide groove, there are disposed the first protection layer 32, recording layer 33, second protection layer 34, reflection layer 35, and the overcoat layer 36. Further, preferably, the print layer 37 is laminated on the overcoat layer 36, and the hard-coat layer 38 on a mirror surface of the substrate 31.

The substrate 31 is usually formed from glass, ceramics or a resin. From a viewpoint of moldability and cost, a resin substrate is preferable. As examples of resins, there are the polycarbonate resin, acrylic resin, epoxy resin, polystyrene resin, acrylonitrile-styrene copolymer resin, polyethylene resin, polypropylene resin, silicone resin, fluororesin, ABS resin, and urethane resin. From a viewpoint of moldability, optical characteristic, and cost, the polycarbonate resin and the acrylic resin are preferable.

However, in the case of applying an optical information recording medium of the fourth embodiment to a rewritable disk (CD-RW), it is desirable to meet the following condition. Namely, a guide groove (a groove) formed on the substrate to be used has a width between 0.25 and 0.65 μm, and preferably between 0.30 and 0.55 μm, has a depth between 250 and 650 Å, and preferably between 300 and 550 Å. Although there is no particular limitation on the thickness of the substrate 31, it is preferable that the substrate 31 is 1.2 mm or 0.6 mm thick.

It is preferable that the recording layer 33 is made from material that includes a phase change type recording material including Ge, Ga, Sb and Te as main four elements, because of its satisfactory recording (amorphous) sensitivity/recording velocity, erasing (crystallization) sensitivity/erasing speed, and erasing ratio respectively. GeGaSbTe has an optimum recording linear velocity depending on its composition ratio. Therefore, it is necessary to adjust the composition ratio of this GeGaSbTe based on a target recording linear velocity and a target linear velocity area. As a result of investigations so far carried out, it has been found that the composition ratio of Te in the GeGaSbTe recording layer has a high correlation with the recording linear velocity.

The optical information recording medium is required to satisfy signal reproduction stability and signal life in addition to the capability of recording and erasing. As the recording layer 33 that can satisfy the whole requirement, a GeGaSbTe system is excellent. This system has been effective when respective composition ratios $\alpha$, $\beta$, $\gamma$, and $\delta$ (atomic percentages) satisfy, when $\alpha+\beta+\gamma+\delta=100$, $0.1 \leq \alpha < 7.0$, $1 \leq \beta < 9$, $61 \leq \gamma \leq 75$, and $22 \leq \delta \leq 30$.

Reproduction stability of a signal and life of a signal have been insufficient when Ge exceeds 7.0 atomic percentage, Ga exceeds 9 atomic percentage, and Sb exceeds 75 atomic percentage. As the content of Te produces a large effect on the re-crystallization linear velocity, it is preferable that Te is at least 22 atomic percentage or above and 30 atomic percentage or below, even when a control is carried out by adjusting a recording layer thickness and thermal conductivity of other layers.

In order to improve the reproduction stability of a signal and the life of a signal, it has been effective to add to the recording layer at least one kind of element selected from a group consisting of In, Zn, Sn, Si, Pb, Co, Cr, Cu, Ag, Au, Pd, Pt, S, Se, Ta, Nb, V, Bi, Zr, Ti, Al, Mn, Mo, Rh, C, N, and O. Degradation in the reproduction of a signal and a reduction in the life of a signal have been due to the crystallization of an amorphous mark. In order to suppress the crystallization of an amorphous mark, it has been effective to add to the recording layer at least one kind of element selected from the above elements. Although a mechanism is not clear, it has been considered that these elements enter a space in GeGaSbTe and form chemical bonding, thereby to form a compound of GeGaSbTe or an alloy, which works as an additive for suppressing the crystallization of an amorphous mark. Therefore, it is effective to use an element that has a small atomic radius, that has a large chemical bonding with GeGaSbTe, and that has large chemical bonding strength. Particularly, C, N, O, Si, Sn, and Ag are effective. It is effective that the quantity of these additive elements is 7 atomic percentage or below of the recording layer. When the quantity is below 7 atomic percentage, it is possible to maintain the intrinsic recording/erasing characteristics of the GeGaSbTe recording layer, and no non-erased portions are left behind.

Further, the preservation reliability of high linear velocity recording and erasing of the optical information recording medium is an extremely important item. In the fourth embodiment, in the relation of the composition of Ge and Ga, it has been found that the high linear velocity correspondence and the preservation reliability are in good balance when $-8 \leq \alpha - \beta \leq 3$. When $\alpha - \beta$ exceeds 3, there has been a tendency that an optimum linear velocity during a recording/erasing is slow. Further, when $\alpha - \beta$ is less than $-8$, the preservation of the optical information recording medium has been insufficient. Therefore, it has been effective to take balance of both characteristics when $-8 \leq \alpha - \beta \leq 3$.

Further, when the linear velocity becomes faster, it becomes important to secure a reflectivity of the optical information recording medium, particularly, the reflectivity during the initialization. In the fourth embodiment, in the relation of the composition of Sb and Te, it has been found that the reflectivity necessary for the initialization reaches when $\gamma + \delta \leq 88$.

It is desirable that the recording layer 33 has a thickness between 10 and 50 nm, and preferably between 12 and 30 nm. Further, considering the initial characteristic of jitter, over-writing characteristic, and mass-production efficiency, it is preferable that the recording layer 33 has a thickness between 14 and 25 nm. When the recording layer 33 is thicker than 10 nm, the light-absorptance is maintained whereby better recording characteristics can be achieved. When the recording layer 33 is thinner than 50 nm, a uniform phase change can be obtained easily even at a high speed. This recording layer can be formed according to various kinds of vapor deposition methods, such as, for example, the vacuum deposition method, sputtering method, plasma CVD method, optical CVD method, ion-plating method, and the electronic beam deposition method. Among these methods, the sputtering method is excellent from a viewpoint of mass-production efficiency and film quality.

The first and second protection layers 32 and 34 (dielectric layers) may be formed from metal oxides like SiO, $SiO_2$, ZnO, $SnO_2$, $Al_2O_3$, $TiO_2$, $In_2O_3$, MgO, and $ZrO_2$, nitrides like $Si_3N_4$, AlN, TiN, BN, and ZrN, a sulfide like ZnS, $In_2S_3$, and $TaS_4$, carbides like SiC, TaC, $B_4C$, WC, TiC, and Zr, and diamond carbon. These materials can be used singularly or in combination. When necessary, an impurity may be included in the material. Further, a dielectric layer may be formed in a multi-player when necessary. However, it is necessary that the melting point of the first and second protection layers 32 and 34 is higher than that of the recording layer 33. The first and second protection layers 32 and 34 can be formed using any know conventional vapor deposition methods. Examples of such vapor deposition methods are the vacuum deposition method, sputtering method, plasma CVD method, optical CVD method, ion-plating method, and the electronic beam deposition method. Among these, the sputtering method is excellent from a viewpoint of mass-production efficiency and film quality.

The thickness of the first protection layer 32 produces large influence on the reflectivity. In order to satisfy the reflectivity 0.15 to 0.25 as a standard of a CD-RW disk in a reproduction wavelength of 780 nm and 650 nm, it is required that the first protection layer 32 has thickness between 65 and 130 m. By forming the first protection layer 32 having a proper thickness, it becomes possible to satisfy the reflectivity of DVD having the reproduction wavelength of 650 nm, and satisfy the reproduction compatibility of the DVD. It is desirable that the second protection layer 34 has a thickness between 15 and 45 nm, and preferably between 20 and 40 nm. When the second protection layer 34 is thicker than 15 nm, this layer does not properly perform the function of heat-resistance, and the sensitivity is does not lower so easily. On the other hand, when the second protection layer 34 is thinner than 45 nm, the interface separation does not occur whereby and the repetitive recording performance is maintained.

The reflection layer 35 can be made from metals like Al, Au, Ag, Cu, Ta, Ti, and W, or an alloy that includes these elements. Elements like Cr, Ti, Si, Cu, Ag, Pd, and Ta may be added to the reflection layer 35. The reflection layer 35 can be formed using any conventionally known vapor deposition methods. Examples of such vapor deposition methods are the vacuum deposition method, sputtering method, plasma CVD method, optical CVD method, ion-plating method, and the electronic beam deposition method. It is desirable that the reflection layer 35 has a thickness between 70 and 200 nm, and preferably between 100 and 160 nm. It is also possible to make the reflection layer 35 have a multi-layer structure. When the reflection layer 35 has the multi-layer structure, each layer in the multi-layer structure needs to have a thickness of at least 10 nm. It is desirable that a total thickness of multi-layer structure is between 50 and 160 nm.

It is preferable to form the overcoat layer 36, on the reflection layer 35, for preventing the reflection layer 35 from being oxidized. The overcoat layer 36 may be formed by spin coating an ultraviolet-ray-cured resin. It is desirable that the overcoat layer 36 has a thickness between 3 and 15 µm. When the overcoat layer 36 is thicker than 3 µm, it is possible to suppress the occurrence of an error that may be generated when the print layer 37 is laminated on the overcoat layer 36. On the other hand, when the overcoat layer 36 is thinner than 15 µm, the internal stress does not become larger whereby the mechanical characteristic of the disk are unaffected.

The hard-coat layer 38 may be formed by spin coating an ultraviolet-ray-cured resin. It is desirable that the hard-coat layer has a thickness between 2 and 6 µm. When the hard-coat layer 38 is thicker than 2 µm, it is possible to obtain sufficient friction damage-proof characteristic. When the hard-coat layer 38 is thinner than 6 µm, the internal stress does not become larger whereby the mechanical characteristic of the disk are unaffected. The hard-coat layer 38 should be harder to the extent that is not hurt when the layer is rubbed with cloth. For example, the hard-coat layer 38 should be harder than H on the hardness scale for pencils. According to the need, it is effective to mix a conductive material into the layer to prevent a charging, thereby to prevent the layer from being adhered with dusts.

In general, in the case of carrying out a multi-speed recording and a CAV recording, a low linear velocity becomes excessive recording power, and a high linear velocity becomes a shortage in the recording power. Therefore, it is necessary to take balance between the recording linear velocity and the recording power. As a concrete method, it is possible to obtain high power when the recording is carried out at a high linear velocity. This is general as observed in a CD-R or the like.

Figure 15:
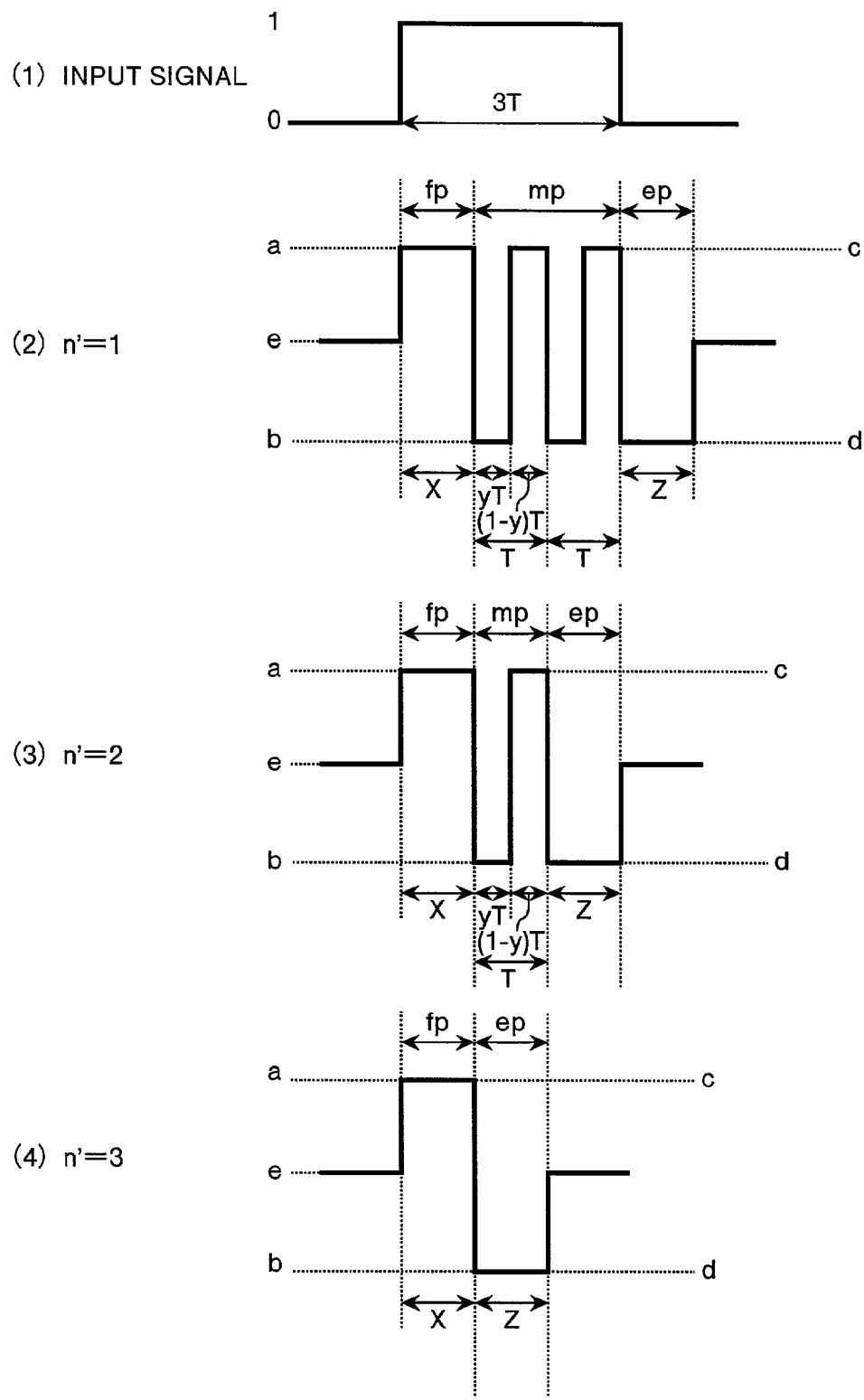
FIG. 15 is a diagram for explaining a recording pulse waveform.

FIG. 15 is a diagram for explaining a recording pulse waveform. In the fourth embodiment, it has been found that it is effective to increase or decrease the duty ratio of a multi-pulse portion (hereinafter to be referred to as an mp portion) in FIG. 15 at a recording linear velocity. The duty ratio refers to a time of a power level b of a low-level pulse in the mp portion divided by a time width of the mp portion. This information recording method has been particularly effective for an information recording medium that uses Ge, Ga, Sb, and Te as main components of the recording layer. This is because the thermal property of the recording layer that uses Ge, Ga, Sb, and Te as main components matches the recording pulse wave.

Figure 16:
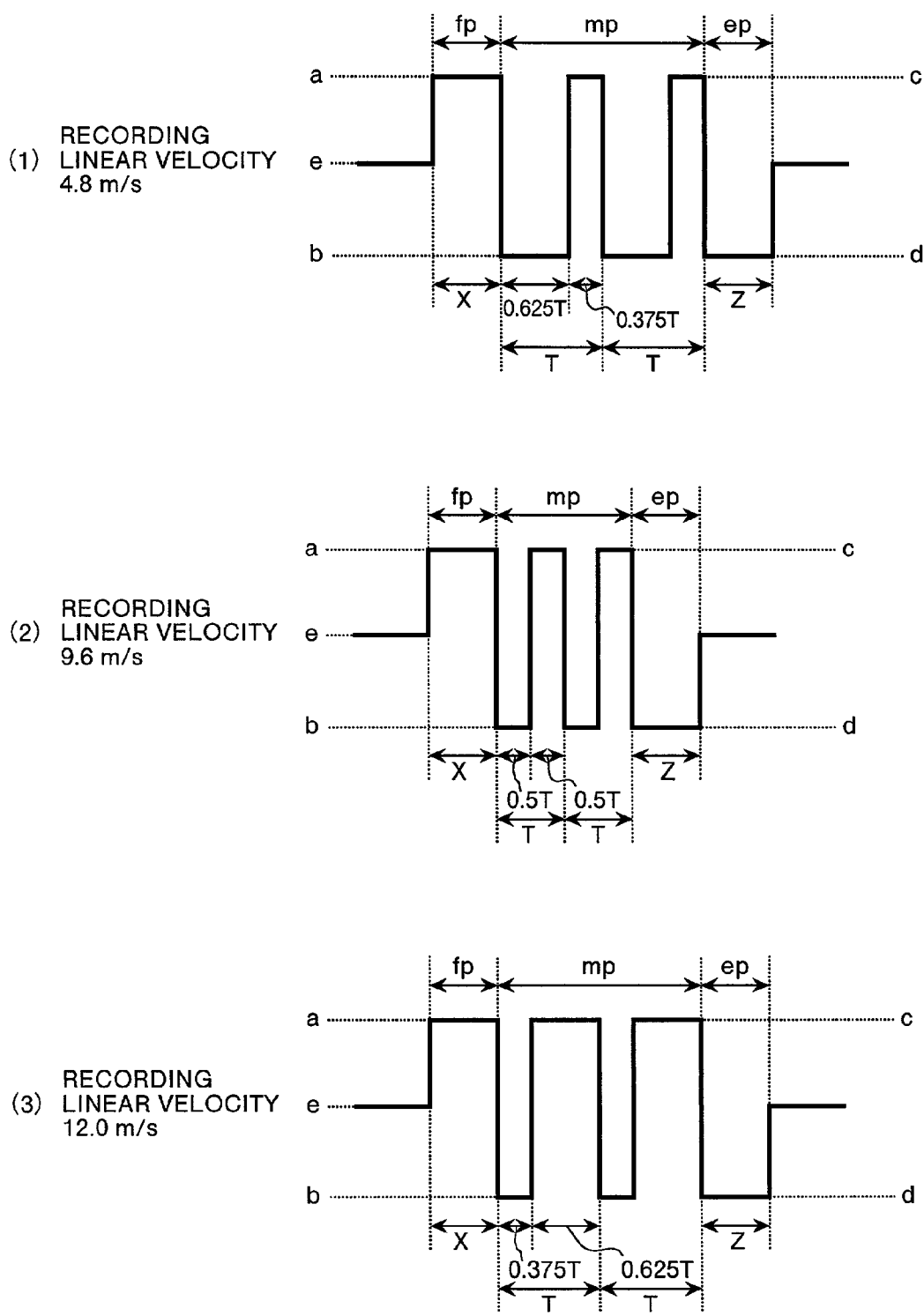
FIG. 16 is a diagram showing a recording waveform of a multi-speed recording at four to ten times the recording velocity of a CD-RW as one example of the fourth embodiment.

FIG. 16 shows a recording waveform of a multi-speed recording at four times to ten times the recording velocity of a CD-RW as one example of the fourth embodiment. This example also corresponds to a CAV recording of an inner periphery 4.8 m/s and an outer periphery 12.0 m/s. In this example, a duty ratio of the mp portion is decreased by matching duty ratios 0.625, 0.5, and 0.375 of the mp portion and an increase in the recording linear velocity, at the recording linear velocities 4.8, 9.6, and 12.0 m/s respectively. At a low recording linear velocity of 4.8 m/s, it is possible to decrease surplus thermal damage by making small a recording pulse in the mp portion, and it is possible to record a mark with small positional deviation of an edge by increasing a cooling time of the mp portion. On the other hand, at a high recording linear velocity of 12.0 m/s, it is possible to give as much energy as possible to a phase change of the recording layer 33, by making large the recording pulse of the mp portion. Further, because of a high speed, it is possible to adjust a cooling condition of the recording layer even if the cooling time of the mp portion is short, and it is possible to record a mark without any positional deviation of an edge.

In a phase change type optical information recording medium that involves melting and rapid cooling of the recording layer, it is possible to obtain a balance between the melting and the cooling of the recording layer when the duty of the mp portion of the recording pulse is near 0.5. This is advantageous for various signal qualities and the overwriting.

Therefore, in considering a matching of the drive-medium, at what recording linear velocity the duty ratio 0.5 of the mp portion is to be set in the multi-speed recording becomes an issue. In the fourth embodiment, it has become clear that a recording linear velocity at which the duty ratio of the mp portion becomes 0.5 is larger than (a minimum recording linear velocity+a maximum recording linear velocity)/2 and equal to or less than the maximum recording linear velocity. A recording linear velocity that is often used in a drive that can achieve a multi-speed recording is a maximum recording linear velocity. In a CAV recording, a recording linear velocity becomes a high-speed recording at an outer periphery at which there is a large influence to a mechanical characteristic of the disk. Accordingly, the signal quality of a high-speed recording becomes more important in the CAV recording as well. From the above, in order to carry out a recording with higher reliability in practical application, it has been effective to set a recording pulse waveform having a duty ratio 0.5 of the mp portion with high reliability at a high-speed recording side. Further, it has been more effective that a recording linear velocity at which the duty ratio of the mp portion becomes 0.5 is larger than 0.55×(a minimum recording linear velocity+a maximum recording linear velocity) and less than the maximum recording linear velocity.

Figure 17:
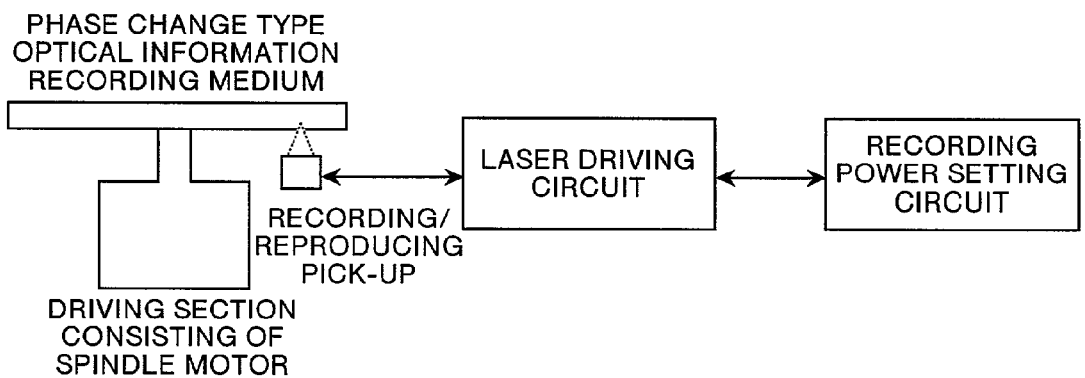
FIG. 17 is a diagram for explaining an example of a recording/reproducing apparatus of the optical information recording medium according to the fourth embodiment of the invention.
Figure 18:
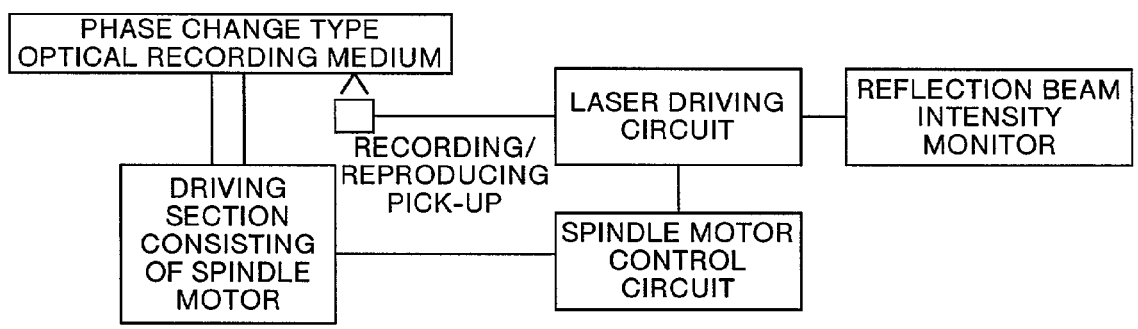
FIG. 18 is an evaluation system diagram of a dislocation linear velocity.

FIG. 17 is a diagram for explaining an example of an apparatus for recording/reproducing information in the optical information recording medium according to the fourth embodiment of the invention. The optical information recording medium is driven to rotate with driving means consisting of the spindle motor, and a light source consisting of a semiconductor laser is driven with a laser driving circuit as light-source driving means. A laser beam having a duty ratio of the mp portion increased or decreased at a recording linear velocity shown in FIG. 16 is irradiated onto an optical information recording medium via a not shown optical system from a semiconductor laser using a recording/reproducing pick-up. A phase change is generated on the recording layer of the optical information recording medium. A reflection beam from the optical information recording medium is received with the recording/reproducing pick-up, thereby to record/reproduce information onto/from the optical information recording medium.

Optimum recording power of the recording/reproducing pick-up is set by a recording power setting circuit as a recording setting means. The apparatus for recording/reproducing information on/from the optical information recording medium generates a phase change in the recording layer of the optical information recording medium by irradiating a laser beam onto the optical information recording medium with the recording/reproducing pick-up, and carries out a recording/reproduction of information onto/from the optical information recording medium, and a rewriting of information. This recording/reproducing apparatus has recording means for recording information by modulating a signal to be recorded with a modulator, and recording this signal onto the optical information recording medium with the recording/reproducing pick-up.

This recording means including this pick-up carries out a recording of information based on what is called a PWM recording system that records a mark to record a signal as a width of the mark onto a recording layer of the optical information recording medium. The recording means modulates the signal to be recorded with a modulator using a clock according to the EFM (Eight-to-Fourteen Modulation) system that is suitable for recording the information on a rewritable compact disk, or an improved modulation system of this system.

At the time of carrying out a recording according to the PWM recording system, the recording means uses the following. A recording beam at the time of recording or rewriting a 0 signal having a signal width n×T after modulation (where n is a positive integer equal to or more than 1, and T represents a clock time, that is a time corresponding to a period of a clock used for modulating a signal) is a continuous beam having a power level e, and a recording beam pulse string at the time of recording or rewriting a 1 signal having a signal width nT after modulation is a laser wave pulse string that has a pulse portion fp having a time width x and a power level a, a multi-pulse portion mp in which a low-level pulse of a power level b having a time width T in total and a high-level pulse having a power level c alternately appear and continue by (n−n') times in total at a duty ratio y, and a pulse portion op having a time width z and a power level d, where x, y, and z are in relationships of T×0.5≦x≦T×2.0, 0.125≦y≦0.875, and T×0.125≦y≦T, and n' is a positive integer such that n'≦n, and a & c>e>b & d. FIG. 16 shows a case where n'=1.

The fourth embodiment will be explained in further detail based on an example.

A polycarbonate substrate 31 of thickness 1.2 mm was used. Groove was formed on this substrate 31. This grove had a width 0.5 μm, and depth 35 nm. On this substrate 31, following layers were laminated using the sputtering method. That is, the first protection layer 32, recording layer 33, second protection layer 34, and the reflection layer 35 were formed on the substrate 31. The first and second protection layers 32 and 34 were made from ZnSSiO$_2$. The first protection layer 32 has a thickness of 90 nm, and the second protection layer 34 has a thickness of 30 nm. The recording layer 33 was made from material having a composition shown in Table 18 to obtain Examples 61 to 66. The recording layer 33 had a thickness of 18 nm. The reflection layer 35 was made from an aluminum alloy. The reflection layer 6 had a thickness of 140 nm.

TABLE 18

| | RECORDING LAYER COMPOSITION (at %) | | | | | RECORDING LINEAR VELOCITY (m/s) | | | DUTY RATIO OF mp PORTION | | |
|---|---|---|---|---|---|---|---|---|---|---|---|
| EXAMPLE | Ge | Ga | Sb | Te | N | INNER PERIPHERY | INTER-MEDIATE PERIPHERY | OUTER PERIPHERY | INNER PERIPHERY | INTER-MEDIATE PERIPHERY | OUTER PERIPHERY |
| 61 | 2 | 1 | 75 | 22 | | 5 | 10 | 12.5 | 0.6 | 0.48 | 0.36 |
| 62 | 1 | 9 | 67 | 22 | 1 | 12 | 24 | 30 | 0.375 | 0.24 | 0.2 |

TABLE 18-continued

| | RECORDING LAYER COMPOSITION (at %) | | | | | RECORDING LINEAR VELOCITY (m/s) | | | DUTY RATIO OF mp PORTION | | |
|---|---|---|---|---|---|---|---|---|---|---|---|
| EXAMPLE | Ge | Ga | Sb | Te | N | INNER PERIPHERY | INTERMEDIATE PERIPHERY | OUTER PERIPHERY | INNER PERIPHERY | INTERMEDIATE PERIPHERY | OUTER PERIPHERY |
| 63 | 4 | 7 | 61 | 28 | | 4.8 | 9.6 | 12 | 0.625 | 0.5 | 0.375 |
| 64 | 7 | 5 | 66 | 22 | | 6 | 12 | 15 | 0.5 | 0.375 | 0.33 |
| 65 | 3 | 3 | 61 | 30 | 3 | 4.8 | 9.6 | 12 | 0.625 | 0.5 | 0.375 |
| 66 | 0.1 | 8.1 | 64.8 | 22 | 5 | 19.2 | 38.4 | 48 | 0.275 | 0.175 | 0.125 |

As a result, a laminate having a layer structure as follows was formed. That is, the substrate 31 (composition: polycarbonate), first protection layer 32 (composition: ZnS.SiO$_2$, thickness: 90 nm), recording layer 33 (composition: as shown in Table 18, thickness: 18 nm), second protection layer 34 (composition: ZnS.SiO$_2$, thickness: 30 nm), and the reflection layer 35 (composition: Al alloy, thickness: 140 nm). Moreover, the overcoat layer 36 was formed on the reflection layer 35, and the hard coat layer 38 was formed on the other surface of the substrate 31 by spin coating an ultraviolet-ray-cured type resin to obtain a single-plate disk of the optical information recording medium. Finally, the print layer 37 was formed on the overcoat layer 36.

Next, the entire surface of this optical information recording medium was crystallized using an initializing unit having a large diameter LD.

The phase change type optical information recording medium obtained based on the above method has been recorded with information at a recording linear velocity described in examples 61 to 66, and in a pulse wave having a duty rate of the mp portion shown in Table 18. An optical recording apparatus used in this example is similar to that shown in FIG. 17. The optical recording apparatus used has a pick-up having a wavelength 780 nm, and NA 0.5. A recording signal used has been an EFM-modulated input signal. As a result of reproducing at 1.2 m/s signals that have been recorded at respective linear velocities, it has been possible to obtain satisfactory initial jitters of 22 ns, 20 ns, and 23 ns. After overwriting by 10,000 times at the respective recording linear velocities, it has been possible to obtain satisfactory jitters of 32 ns, 30 ns, and 33 ns.

Further, a preservation test on the optical information recording medium was carried out by leaving the disk for 500 hours in an environment at a temperature 80° C. and humidity 85%. The optical information recording medium did not show any signs of oxidization of the recording layer 33 or a change in the signal characteristics. Thus, the optical information recording medium can be preserved with great satisfaction for a long time.

As explained above, according to the present invention, it is possible to provide an optical information recording medium capable of recording at linear velocity that is higher than the even the maximum recording linear velocity of the optical information recording medium.

Moreover, it is possible distinguish whether the optical information recording medium is according to the conventional technology or it is according to the present invention. Therefore, it is possible to provide an optical information recording medium capable of avoiding a recording on a conventional disk at a speed faster than a maximum recording linear velocity by error.

Furthermore, it is possible to provide an optical information recording medium having good signal quality, excellent overwriting characteristic. Moreover, it is possible to provide an optical information recording medium that is very reliable and can be mass-produced efficiently.

Furthermore, it is possible to provide an optical information recording medium capable of recording at a faster linear velocity than a maximum recording linear velocity, based on a fine adjustment of a currently-available general-purpose optical information recording apparatus.

According to the method of recording/reproducing optical information according to the present invention, it is decided whether it is possible or not to record at a recording linear velocity higher than a maximum recording linear velocity, and recording is carried out at a recording linear velocity higher than a maximum recording linear velocity, only when it is decided that it is possible to do so. Therefore, it is possible to provide an optical information recording medium and an optical information recording/reproducing method having no recording error.

Furthermore, it is possible to provide an optical information recording medium that is excellent in power margin and that has satisfactory repetitive recording characteristic, recording and erasing sensitivities, and preservation characteristic. Moreover, when manufacturing the optical information recording medium, it is possible to efficiently form a recording layer having desired characteristics.

Furthermore, it is possible to obtain an optical information recording medium that is capable of recording/erasing in a high linear velocity area (4.8 to 48 m/s) by using Ge, Ga, Sb, and Te as main constituent elements of the optical information recording medium, and specifying a film thickness and a composition of a recording layer, and that is excellent in total characteristics including reproduction stability and the life of a signal.

Furthermore, it is possible to obtain an optical information recording medium with improved stability of reproducing a signal in a high-linear velocity area and improved life of a signal, by adding at least one element selected from a group consisting of In, Zn, Sn, Si, Pb, Co, Cr, Cu, Ag, Au, Pd, Pt, S, Se, Ta, Nb, V, Bi, Zr, Ti, Al, Mn, Mo, Rh, C, N, and O, to a recording layer that includes Ge, Ga, Sb, and Te as main constituent elements of the recording layer.

Furthermore, it is possible to obtain an optical information recording medium that has high-linear velocity correspondence and preservation characteristic in good balance, by specifying a composition ratio of Ge to Ga.

Furthermore, it is possible to obtain an optical information recording medium that has a reflectivity that is necessary for initialization and recording/erasing in a high linear velocity area, by specifying a composition ratio of Sb to Te.

Furthermore, it is possible to obtain an optical information recording medium that can achieve a high-linear velocity recording based on a general-purpose recording strategy, by specifying a film thickness of each layer of the optical information recording medium and a composition of a recording layer, and by specifying a time width of fp and ep and a duty ratio of mp, in a recording wave pulse string for recording or rewriting a signal, at the time of recording information onto the optical information recording medium according to a PWM recording system.

Furthermore, it is possible to obtain an optical information recording medium capable of achieving a multi-speed recording or a CAV recording, by increasing or decreasing a duty ratio y of a pulse portion mp at a recording linear velocity, in a recording wave pulse string for recording or rewriting a signal, at the time of recording information onto the optical information recording medium according to a PWM recording system.

The present document incorporates by reference the entire contents of Japanese priority documents, 2000-297364 filed in Japan on Sep. 28, 2000, 2000-310536 filed in Japan on Oct. 11, 2000, 2000-367361 filed in Japan on Dec. 1, 2000 and 2001-088516 filed in Japan on Mar. 26, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical information recording medium comprising:
   a transparent substrate having a concentric circular guide groove or a spiral guide groove, said guide groove having land portions and groove portions formed thereon; and
   a phase change type recording layer on said transparent substrate;
   wherein information that indicates a standard recording linear velocity Vr and/or a maximum recording linear velocity Vh is stored on the medium, said stored information being recorded onto said substrate;
   wherein, while irradiating on land portions or groove portions formed on said guide groove energy enabled to melt the material of said phase change type recording layer and while increasing a linear velocity of said medium and scanning, the linear velocity at which the reflectivity of said optical information recording medium decreases, in comparison to that before the energy is radiated, is defined as uppermost recrystallization linear velocity V;
   wherein the uppermost recrystallization linear velocity V at the time when a focused semiconductor beam irradiates said groove portions or land portions of said guide groove satisfies a relation, the focused semiconductor beam being used for recording or reproducing, $V \geq Vr \times 0.85$ or $V \geq Vh \times 0.85$; and wherein a track pitch of said guide groove is between 0.2 and 1.4 μm, and the uppermost recrystallization linear velocity V is between 16 and 24 m/s.

2. The optical information recording medium according to claim 1, wherein the uppermost recrystallization linear velocity V satisfies a relation $Vr \times 0.9 \leq V \leq Vr \times 2.0$ or $Vh \times 0.9 \leq V \leq Vh \times 2.0$.

3. The optical information recording medium according to claim 1, wherein said optical information recording medium further stores information that indicates that said optical information recording medium satisfies the relation relating to the uppermost recrystallization linear velocity V.

4. The optical information recording medium according to claim 1, wherein at the time of crystallizing an entire surface of said phase change type recording layer, an initialization linear velocity Vi satisfies a relation $Vr \times 0.5 \leq Vi \leq Vr \times 1.6$ or $Vr \times 0.5 \leq Vi \leq Vr \times 1.6$.

5. The optical information recording medium according to claim 1, wherein said phase change type recording layer is in a not-recorded status and has generally a cubic lattice crystal structure.

6. The optical information recording medium according to claim 1, wherein said phase change type recording layer is made from a material that includes a material that satisfies the relation $Sb_{102}Te_{100-\chi}$ (where $\chi$ is atomic percentage and $40 \leq \chi \leq 80$).

7. The optical information recording medium according to claim 6, wherein said phase change type recording layer has at least one element selected from a group consisting of Ga, Ge, Ag, In, Bi, C, N, O, Si, and S, as an additive element.

8. The optical information recording medium according to claim 1, wherein said phase change type recording layer is made of material that satisfies a relation $(Ag, Ge)_\alpha(In, Ga, Bi)_\beta Sb_\gamma Te_{67}$, where (Ag, Ge) means at least one element selected from Ag and Ge, (In, Ga, Bi) means at least one element selected from In, Ga, and Bi, α, β, γ, and δ represent atomic percentages and satisfy the relation $0.1 \leq \alpha \leq 7$, $1 \leq \beta \leq 15$, $61 \leq \gamma \leq 85$, and $20 \leq \delta \leq 30$.

9. The optical information recording medium according to claim 1, wherein under recording conditions such that
   when n represents an integer equal to or higher than 1, and T represents a clock time corresponding to a period of a clock used for modulating a signal, a recording beam at the time of recording or rewriting a 0 signal having a signal width n×T after modulation is a continuous beam having a power level e,
   a pulse string of a recording beam at the time of recording or rewriting a 1 signal having a signal width n×T after modulation is a laser wave pulse string that has a pulse portion fp having a time width x and a power level a, a multi-pulse portion mp in which a low-level pulse of a power level b having a time width T in total and a high-level pulse having a power level c alternately appear and continue by (n–n') times in total at a duty ratio y, and a pulse portion ep having a time width z and a power level d, and the time width x, duty ratio y, and the time width z satisfy relations T×0.125≦x≦T×2.0, 0.125≦y≦0.875, and T×0.125≦z≦T, and the power levels a b, c, d, and e satisfy a relation a & c >e>b & d, then a first protection layer, said phase change type recording layer, a second protection layer, a reflection layer, and a resin layer are formed on said transparent substrate in such a manner that the thickness of each layer makes it possible to record at a higher speed than the standard recording linear velocity Vr or the maximum recording linear velocity Vh.

10. The optical information recording medium according to claim 1, wherein a material constituting said third protection layer is formed by DC sputtering.

11. The optical information recording medium according to claim 1, wherein a material constituting said third protection layer includes at least one substance selected from a group consisting of C, Si, SiC, SiN, SiO, and $SiO_2$.

12. The optical information recording medium according to claim 1, wherein a linear velocity when crystallizing an entire surface of said phase change type recording layer is slower than the uppermost recrystallization linear velocity V.

13. The optical information recording medium according to claim 1, wherein said recording layer is made from a phase change recording material that changes between an amorphous state and a crystalline state based on irradiation of an electromagnetic beam, and wherein the phase change recording material includes at least one element selected from Ag, In, Sb, and Te, and a bond coordination number of the selected element/s is different between an amorphous state after a film formation and a crystalline state after an initialization and after an information erasing.

14. The optical information recording medium according to claim 13, wherein among the constituent elements of the phase change recording material, a bond coordination number of Ag and In with respect to Te in the crystalline state is larger than a bond coordination number of Ag and In with respect to Te in the amorphous state.

15. The optical information recording medium according to claim 13, wherein among the constituent elements of the phase change recording material, a bond coordination number of Ag with respect to Te in the amorphous state is between 1.5 and 2.5, and a bond coordination number of Ag with respect to Te in the crystalline state is between 3.5 and 4.5.

16. The optical information recording medium according to claim 13, wherein among the constituent elements of the phase change recording material, a bond coordination number of In with respect to Te in the amorphous state is between 3.0 and 3.8, and a bond coordination number of In with respect to Te in the crystalline state is between 3.4 and 4.2.

17. The optical information recording medium according to claim 13, wherein among the constituent elements of the phase change recording material, a bond coordination number of Sb with respect to Te in the crystalline state is smaller than a bond coordination number of Sb with respect to Te in the amorphous state.

18. The optical information recording medium according to claim 17, wherein among the constituent elements of the phase change recording material, a bond coordination number of Sb with respect to Te in the amorphous state is between 2.7 and 3.5, and a bond coordination number of Sb with respect to Te in the crystalline state is between 2.0 and 2.8.

19. The optical information recording medium according to claim 13, wherein the phase change recording material has an NaCl type structure in the crystalline state.

20. The optical information recording medium according to claim 19, wherein among the constituent elements of the phase change recording material, Cl site in the NaCl type structure occupied by Te has a large number of holes.

21. The optical information recording medium according to claim 20, wherein among the constituent elements of the phase change recording material, Cl site the NaCl type structure to be occupied by Te has holes between 7/12 and 9/12.

22. The optical information recording medium according to claim 1, wherein said substrate is disk-shaped and wherein said phase change type recording layer is stacked on said substrate, is made from material which includes Ge, Ga, Sb, and Te, and when α, β, γ, and δ represent atomic percentages of Ge, Ga, Sb, and Te, and α+β+γ+δ=100, then α, β, γ, and δ satisfy the relations $0.1≦α≦7$, $1≦γ≦9$ $61≦γ≦75$, $22≦δ≦30$.

23. The optical information recording medium according to claim 22, wherein said phase change type recording layer has been added with at least one element selected from a group consisting of In, Zn, Sn, Si, Pb, Co, Cr, Cu, Ag, Au, Pd, Pt, S, Se, Ta, Nb, V, Bi, Zr, Ti, Al, Mn, Mo, Rh, C, N, and O.

24. The optical information recording medium according to claim 22, wherein a composition ratio of Ge and Ga is $-8≦α-β≦3$.

25. The optical information recording medium according to claim 22, wherein a composition ratio of Sb and Te is $γ+δ≧88$.

26. The optical information recording medium according to claim 22, wherein the optical information recording medium is applied with an information recording/reproducing method for recording, reproducing and rewriting information onto/from the optical information recording medium, by generating a phase change in a recording layer of the optical information recording medium based on irradiation of a laser beam onto the optical information recording medium, and it is made possible to execute a multi-speed recording and/or a CAV recording onto the optical information recording medium, based on an arrangement that in the case of recording information onto an information recording medium by modulating a signal according to a PWM recording system, a recording wave at the time of recording or rewriting a 0 signal having a signal width n×T, where T is a clock time, after modulation is a continuous beam having a power level e, and a recording wave pulse string at the time of recording or rewriting a 1 signal having a signal width nT after modulation is an electromagnetic wave pulse string that has a pulse portion fp having a time width x and a power level a, a multi-pulse portion mp in which a low-level pulse of a power level b having a time width T in total and a high-level pulse having a power level c alternately continue by (n−n') times in total at a duty ratio y, and a pulse portion op having a time width z and a power level d, where the time width x, duty ratio y, and the time width z satisfy relations $T×0.5 \leq x \leq T×2.0$, $0.125 \leq y \leq 0.875$, and $T×0.125 \leq z \leq T$, where n' is a positive integer equal to or greater than n, and the power levels a b, c, d, and e satisfy a relation $a \text{ \& } c \geq e \geq b \text{ \& } d$.

27. The optical information recording medium according to claim 26, wherein a duty ratio of the pulse portion mp increases or decreases according to a recording linear velocity.

28. An optical information recording medium comprising:
a transparent substrate having a concentric circular guide groove or a spiral guide groove, said guide groove having land portions and groove portions formed thereon; and
a phase change type recording layer over said transparent substrate, said recording layer being crystallized by initializing with laser radiation;
wherein information that indicates a standard recording linear velocity Vr and/or a maximum recording linear velocity Vh is stored on the medium, said stored information being recorded onto said substrate;
wherein, while irradiating land portions or groove portions formed on said guide groove with energy to melt the material of said phase change type recording layer and while increasing a linear velocity of said medium and scanning said land portions or groove portions formed on said guide groove with said energy, the linear velocity at which the reflectivity of said optical information recording medium decreases, in comparison to that before said irradiating with said energy, is defined as uppermost recrystallization linear velocity V;
wherein the uppermost recrystallization linear velocity V at a time when a focused semiconductor laser beam irradiates said groove portions or land portions of said guide groove satisfies a relation, the focused semiconductor beam being used for recording or reproducing, $$V \geq Vr×0.85$$

or $$V \geq Vh×0.85;\text{ and}$$

wherein a track pitch of said guide groove is between 0.2 and 1.4 μm, and the uppermost recrystallization linear velocity V is between 16 and 24 m/s.

29. An optical information recording medium as in claim 28, wherein said substrate has a thickness of approximately 1.2 mm, and said guide groove has a width between 0.25 and 0.65 micrometers and a depth between 25 and 65 nanometers.

30. An optical information recording medium as in claim 28, wherein said guide groove has a width between 0.30 and 0.55 micrometers and a depth between 30 and 55 nanometers.

31. An optical information recording medium as in claim 28 wherein said substrate has a thickness of approximately 0.6 mm adhered to another substrate to form a disc having a thickness between 1.1 and 1.3 mm, and said guide groove has a width between 0.10 and 0.40 micrometers and a depth between 15 and 65 nanometers.

32. An optical information recording medium as in claim 28, wherein said guide groove has a width between 0.15 and 0.30 micrometers and a depth between 25 and 50 nanometers.

33. An optical information recording medium as in claim 28 in which the medium is a DVD disc.

* * * * *